US011343550B2

(12) United States Patent
Ichikawa et al.

(10) Patent No.: US 11,343,550 B2
(45) Date of Patent: May 24, 2022

(54) TRANSMISSION DEVICE, TRANSMISSION METHOD, AND CONTENT DISTRIBUTION SYSTEM

(71) Applicant: SONY CORPORATION, Tokyo (JP)

(72) Inventors: Yukio Ichikawa, Saitama (JP); Makoto Urushihara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 354 days.

(21) Appl. No.: 16/335,089

(22) PCT Filed: Sep. 14, 2017

(86) PCT No.: PCT/JP2017/033273
§ 371 (c)(1),
(2) Date: Mar. 20, 2019

(87) PCT Pub. No.: WO2018/088026
PCT Pub. Date: May 17, 2018

(65) Prior Publication Data
US 2021/0289242 A1 Sep. 16, 2021

(30) Foreign Application Priority Data
Nov. 11, 2016 (JP) .............................. JP2016-220608

(51) Int. Cl.
H04N 21/238 (2011.01)
H04N 21/414 (2011.01)
(Continued)

(52) U.S. Cl.
CPC ..... H04N 21/23805 (2013.01); H04N 19/122 (2014.11); H04N 19/126 (2014.11);
(Continued)

(58) Field of Classification Search
CPC ........... H04N 21/23805; H04N 19/122; H04N 19/126; H04N 19/176; H04N 21/234363;
(Continued)

(56) References Cited

U.S. PATENT DOCUMENTS

2005/0055456 A1* 3/2005 Chalupsky .............. H04L 47/18
709/233
2008/0075031 A1 3/2008 Ohayon et al.
(Continued)

FOREIGN PATENT DOCUMENTS

CA 2664349 A1 4/2008
CN 101584157 A 11/2009
(Continued)

OTHER PUBLICATIONS

Office Action for CN Patent Application No. 201780067893.3, dated Aug. 5, 2021, 4 pages of Office Action and 2 pages of English Translation.

(Continued)

Primary Examiner — Jefferey F Harold
Assistant Examiner — Franklin S Andramuno
(74) Attorney, Agent, or Firm — Chip Law Group

(57) ABSTRACT

A transmission device encodes content data, divides the encoded content data into a plurality of pieces of transmission data, and transmits the pieces to, through a plurality of uploaders and a plurality of networks corresponding to the plurality of uploaders, a distribution device configured to perform content distribution.

11 Claims, 14 Drawing Sheets

(51) Int. Cl.
- *H04N 21/254* (2011.01)
- *H04N 19/122* (2014.01)
- *H04N 21/2343* (2011.01)
- *H04N 19/176* (2014.01)
- *H04N 21/2347* (2011.01)
- *H04N 21/4784* (2011.01)
- *H04N 19/126* (2014.01)

(52) U.S. Cl.
CPC ....... *H04N 19/176* (2014.11); *H04N 21/2347* (2013.01); *H04N 21/234363* (2013.01); *H04N 21/2541* (2013.01); *H04N 21/41407* (2013.01); *H04N 21/4784* (2013.01)

(58) Field of Classification Search
CPC ........... H04N 21/2347; H04N 21/4784; H04N 21/41407; H04N 21/2541
See application file for complete search history.

(56) References Cited

U.S. PATENT DOCUMENTS

| | | | |
|---|---|---|---|
| 2010/0250127 A1* | 9/2010 | Hilbrandie | G08G 1/0104 701/533 |
| 2011/0061086 A1 | 3/2011 | Huang | |
| 2013/0275545 A1* | 10/2013 | Baptist | G06F 11/1076 709/215 |
| 2014/0187238 A1* | 7/2014 | Tsuda | H04B 17/23 455/425 |
| 2014/0201789 A1 | 7/2014 | Park | |
| 2016/0255346 A1* | 9/2016 | Sato | H04N 19/122 375/240.03 |
| 2016/0306950 A1* | 10/2016 | Schuman | H04N 21/41407 |

FOREIGN PATENT DOCUMENTS

| | | |
|---|---|---|
| CN | 101980509 A | 2/2011 |
| CN | 103414917 A | 11/2013 |
| CN | 104506950 A | 4/2015 |
| CN | 105245578 A | 1/2016 |
| CN | 105723677 A | 6/2016 |
| JP | 2002-164915 A | 6/2002 |
| JP | 2002-344965 A | 11/2002 |
| JP | 2005-176068 A | 6/2005 |
| JP | 2010-505324 A | 2/2010 |
| WO | 2008/038261 A2 | 4/2008 |

OTHER PUBLICATIONS

Office Action for JP Patent Application No. 2018-550049, dated Aug. 17, 2021, 4 pages of Office Action and 4 pages of English Translation.

Office Action for JP Patent Application No. 2018-550049, dated Jan. 18, 2022, 05 pages of English Translation and 05 pages of Office Action.

* cited by examiner

FIG. 6

```
PLAY LIST

#EXTM3U

#EXTINF:1
http://・・・・・・/segment1

#EXTINF:1
http://・・・・・・/segment2

#EXTINF:1
http://・・・・・・/segment3
```

TRANSMISSION DEVICE, TRANSMISSION METHOD, AND CONTENT DISTRIBUTION SYSTEM

CROSS REFERENCE TO RELATED APPLICATIONS

This application is a U.S. National Phase of International Patent Application No. PCT/JP2017/033273 filed on Sep. 14, 2017, which claims priority benefit of Japanese Patent Application No. JP 2016-220608 filed in the Japan Patent Office on Nov. 11, 2016. Each of the above-referenced applications is hereby incorporated herein by reference in its entirety.

TECHNICAL FIELD

The present technology relates to a transmission device, a transmission method, and a content distribution system.

BACKGROUND ART

In a conventionally disclosed system, content data such as moving images and voice is transmitted to the receiving side through a single uploader and a single communication line (Patent Document 1).

CITATION LIST

Patent Document

Patent Document 1: Japanese Patent Application Laid-open No. 2011-66916

SUMMARY OF THE INVENTION

Problems to be Solved by the Invention

For example, in a case where live broadcast is performed with such a system, discontinuity occurs to data transmission or delay occurs to data playback on the receiving side due to error or delay occurred at the communication line, for example, which degrades the real-time characteristic of live broadcast.

The present technology is intended to solve the above-described problem and provide a transmission device, a transmission method, and a content distribution system that are capable of performing content distribution without delay.

Solutions to Problems

To solve the above-described problem, a first technology is a transmission device configured to encode content data, divide the encoded content data into a plurality of pieces of transmission data, and transmit the pieces to, through a plurality of uploaders and a plurality of networks corresponding to the plurality of uploaders, a distribution device configured to perform content distribution.

Furthermore, a second technology is a transmission method of encoding content data, dividing the encoded content data into a plurality of pieces of transmission data, and transmitting the pieces to, through a plurality of uploaders and a plurality of networks corresponding to the plurality of uploaders, a distribution device configured to perform content distribution.

Moreover, a third technology is a content distribution system including: a transmission device configured to encode content data, divide the encoded content data into a plurality of pieces of transmission data, and transmit the pieces to a distribution device through a plurality of uploaders and a plurality of networks corresponding to the plurality of uploaders; and a distribution device configured to receive the transmission data transmitted from the transmission device and transmit the transmission data to a terminal device to perform content distribution.

Effects of the Invention

According to the present technology, content distribution can be performed without delay. Note that the effects described herein are not necessarily limited, and any of the effects described in the specification may be applied.

BRIEF DESCRIPTION OF DRAWINGS

FIG. 6 is a diagram illustrating an exemplary play list.

MODE FOR CARRYING OUT THE INVENTION

Embodiments of the present technology will be described below with reference to the accompanying drawings. Note that the description will be given in the following order.
<1. Embodiment>
[1-1. Configuration of content distribution system]
[1-1-1. Configuration of transmission device]
[1-1-2. Configuration of distribution device]
[1-1-3. Configuration of terminal device]
[1-2. Processing performed by content distribution system]
[1-2-1. Upload to distribution device]
[1-2-2. Update of play list]
[1-2-3. First exemplary distribution to terminal device]
[1-2-4. Second exemplary distribution to terminal device]

[1-2-5. Third exemplary distribution to terminal device]
[1-2-6. Distribution of past content]
[1-3. Effect of parallel upload]
<2. Exemplary applications>
<3. Modifications>

1. Embodiment

[1-1. Configuration of Content Distribution System]

Figure 1:
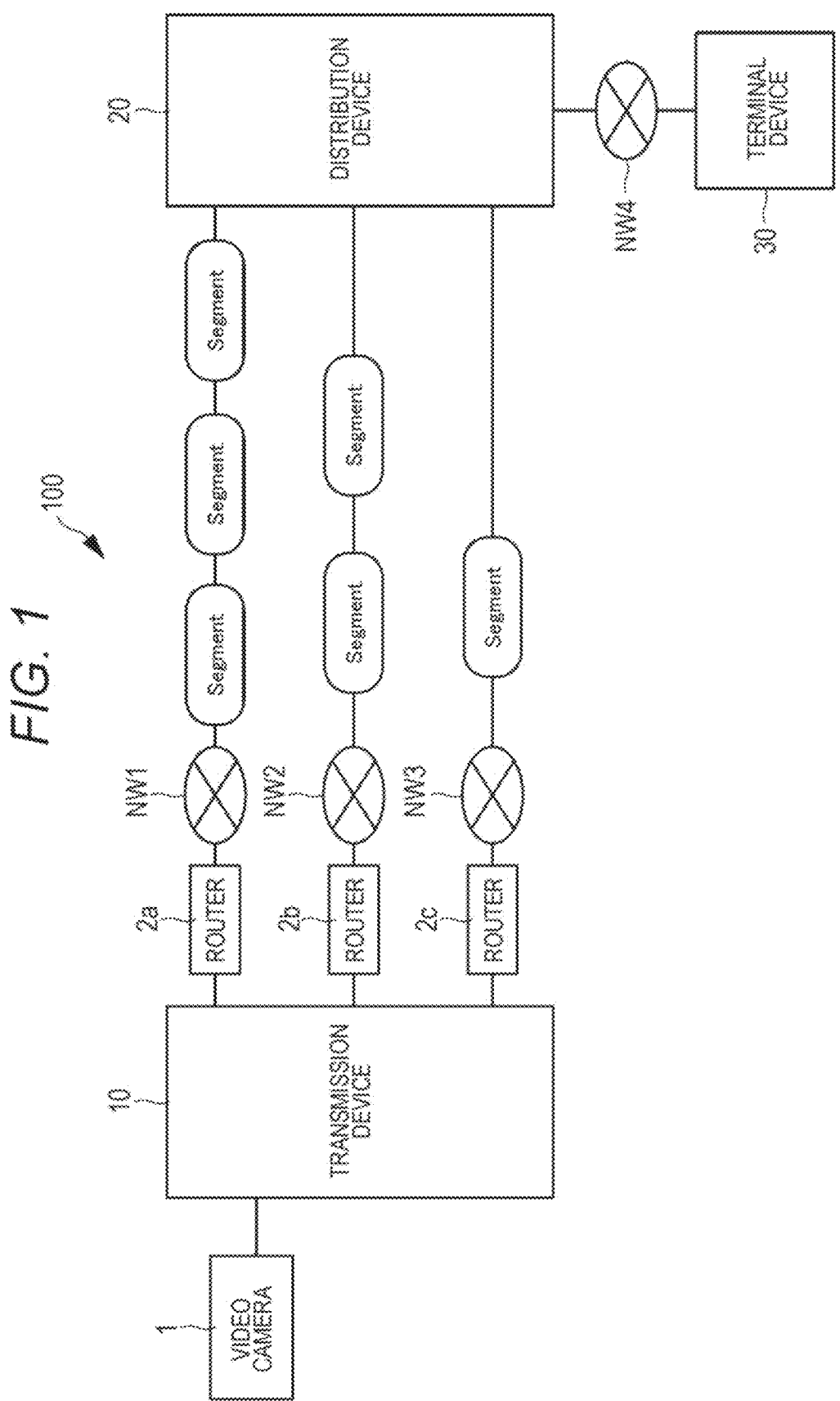
FIG. 1 is a block diagram illustrating the configuration of a content distribution system according to an embodiment of the present technology.

FIG. 1 is a schematic view illustrating the entire configuration of a content distribution system 100 according to the present technology. The content distribution system 100 includes a transmission device 10, a plurality of routers 2a, 2b, and 2c, a distribution device 20 configured to distribute contents, and a terminal device 30 as a content playback terminal used by a content viewer (hereinafter simply referred to as a viewer).

In FIG. 1, the distribution device 20 is connected with the transmission device 10 through a plurality of routers (in the present embodiment, the three routers 2a, 2b, and 2c) and a plurality of networks NW (in the present embodiment, three networks NW1, NW2, and NW3) to perform communication therebetween. Furthermore, the distribution device 20 is connected with the terminal device 30 through the network NW4. In the present embodiment, the content distribution system 100 performs content real-time live distribution by HTTP live streaming (HLS). Note that the number of routers and the number of networks are merely exemplary, and not limited to three. Although described later in detail, the numbers may be any number equal to or larger than two.

The HLS is a protocol for streaming distribution of a live video as a content, and is a function for transmitting audio and video from a normal web server by using a hypertext transfer protocol (HTTP) and recovering the audio and video by a playback terminal. The HLS is available for live distribution (broadcast) and recorded contents (video on demand) and supports a plurality of alternative streams with different bit rates, and client software can intelligently switch the streams in accordance with a network bandwidth change.

The transmission device 10 is connected with an external device (in the present embodiment, a video camera 1). The transmission device 10 transmits (uploads) content data including live video, live voice, and the like captured by the video camera 1 to the distribution device 20 through the routers 2a, 2b, and 2c and the networks NW1, NW2, and NW3. Note that the number of video cameras 1 is not limited to one but may be two or more.

The terminal device 30 is a computer having a communication function, and is a terminal capable of receiving (downloading) and playing back a content distributed from the distribution device 20. Examples of the terminal device 30 include a portable communication terminal such as a smartphone or a cellular phone, a tablet terminal, a portable game machine, a laptop personal computer, a desktop personal computer, a wearable terminal, and the like. The terminal device 30 may be any terminal capable of performing communication with the distribution device 20 through the network NW4 and recovering contents. In the present embodiment, the distribution device 20 can be connected with a plurality of terminal devices 30 each capable of substantially simultaneously viewing the same content through a browser. Note that the communication between the distribution device 20 and the terminal device 30 is performed by using a typical communication protocol.

The distribution device 20 receives and stores content data uploaded from the transmission device 10 through the routers 2a, 2b, and 2c and the networks NW1, NW2, and NW3. Then, the distribution device 20 receives a content distribution request from the terminal device 30 connected through the network NW4, and distributes the corresponding content to the terminal device 30. The distribution device 20 may be achieved by using a cloud system and a cloud computing service.

Note that the networks NW1, NW2, and NW3 may be each any wired or wireless communication network, such as wireless local area network (LAN), wide area network (WAN), or WiFi (wireless fidelity), for example, which allows mutual connection by using the Internet protocol technology.

The routers 2a, 2b, and 2c are communication instruments configured to perform data relay between the transmission device 10 and the distribution device 20 through a network by using transmission control protocol/internet protocol (TCP/IP) as a communication protocol. The routers 2a, 2b, and 2c may be each any network interface, such as a mobile router, a wireless LAN router, a broad band router, or a Long Term Evolution (LTE) router, that are capable of relaying data transmission and reception between the transmission device 10 and the distribution device 20 through a particular network.

In the present embodiment, the transmission device 10 and the distribution device 20 are connected with each other through the plurality of routers 2a, 2b, and 2c and the networks NW1, NW2, and NW3 corresponding to the plurality of respective routers 2a, 2b, and 2c. A virtual wideband broad band line is achieved by bundling a plurality of networks. Since content data is uploaded through the plurality of routers 2a, 2b, and 2c and the plurality of networks NW1, NW2, and NW3, not through a single router and a single network, the content data upload is not delayed nor disconnected when any of the networks becomes unstable or disconnected. Thus, the present technology is particularly useful for real-time live distribution.

Furthermore, in the present embodiment, the plurality of networks NW1, NW2, and NW3 are networks provided by communication carriers (communication business operators) different from each other. Accordingly, when an anomaly such as communication speed decrease or network cutoff has occurred to a network provided by either communication carrier, content upload can be continued through a network provided by another communication carrier to which no anomaly has occurred. Accordingly, live distribution discontinuity and degradation of the real-time characteristic of live distribution can be prevented.

The network NW4 is a network provided by a communication carrier with which a viewer using the terminal device 30 has a contract, and may employ any communication scheme of wired communication or wireless communication.

Figure 2:
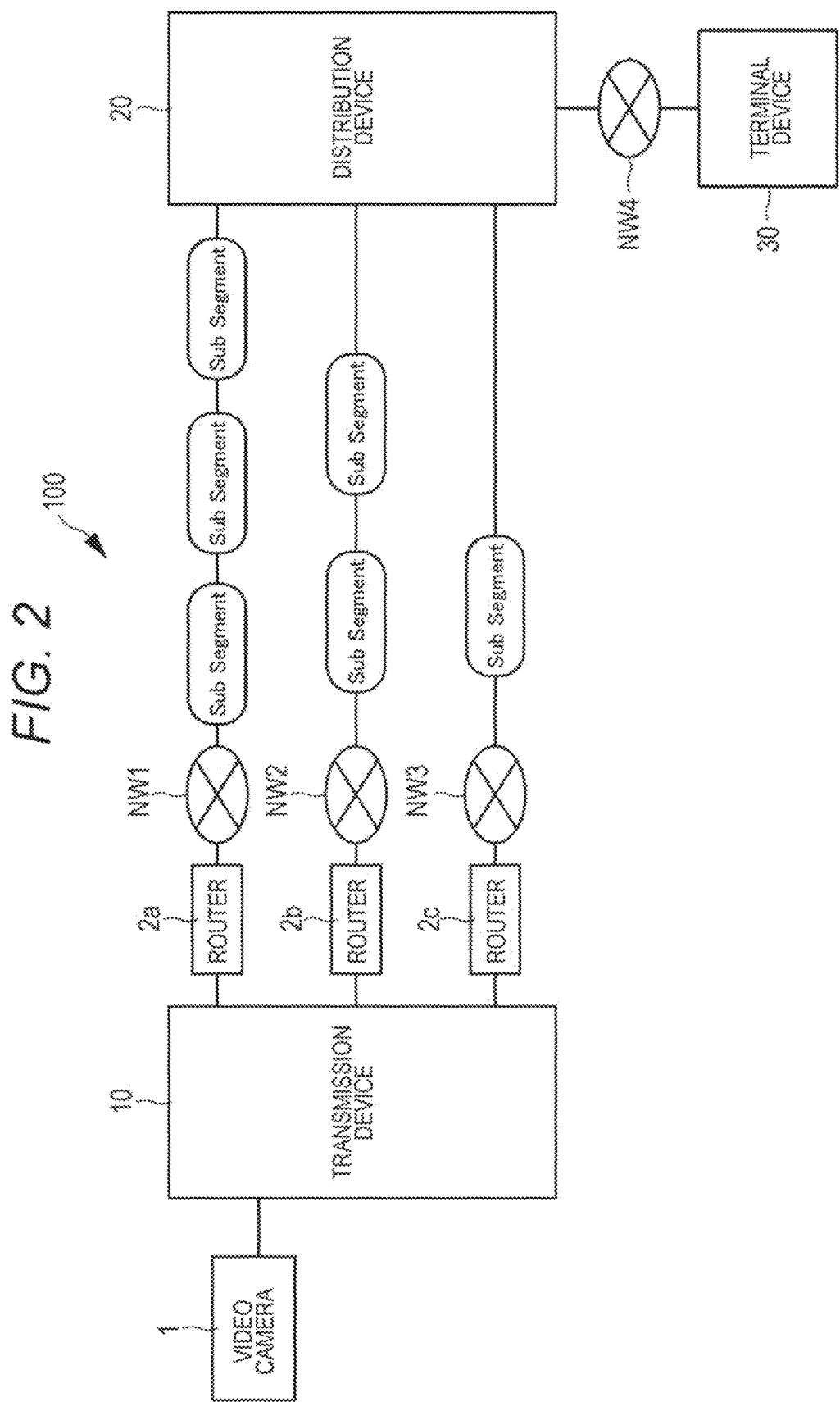
FIG. 2 is a block diagram illustrating the configuration of the content distribution system according to the embodiment of the present technology.

Although described later in detail, in the present embodiment, content data upload from the transmission device 10 to the distribution device 20 is performed in units called segments as illustrated in FIG. 1 or in units called sub segments as illustrated in FIG. 2. The segments and sub segments correspond to transmission data in the claims.

[1-1-1. Configuration of Transmission Device]

Figure 3:
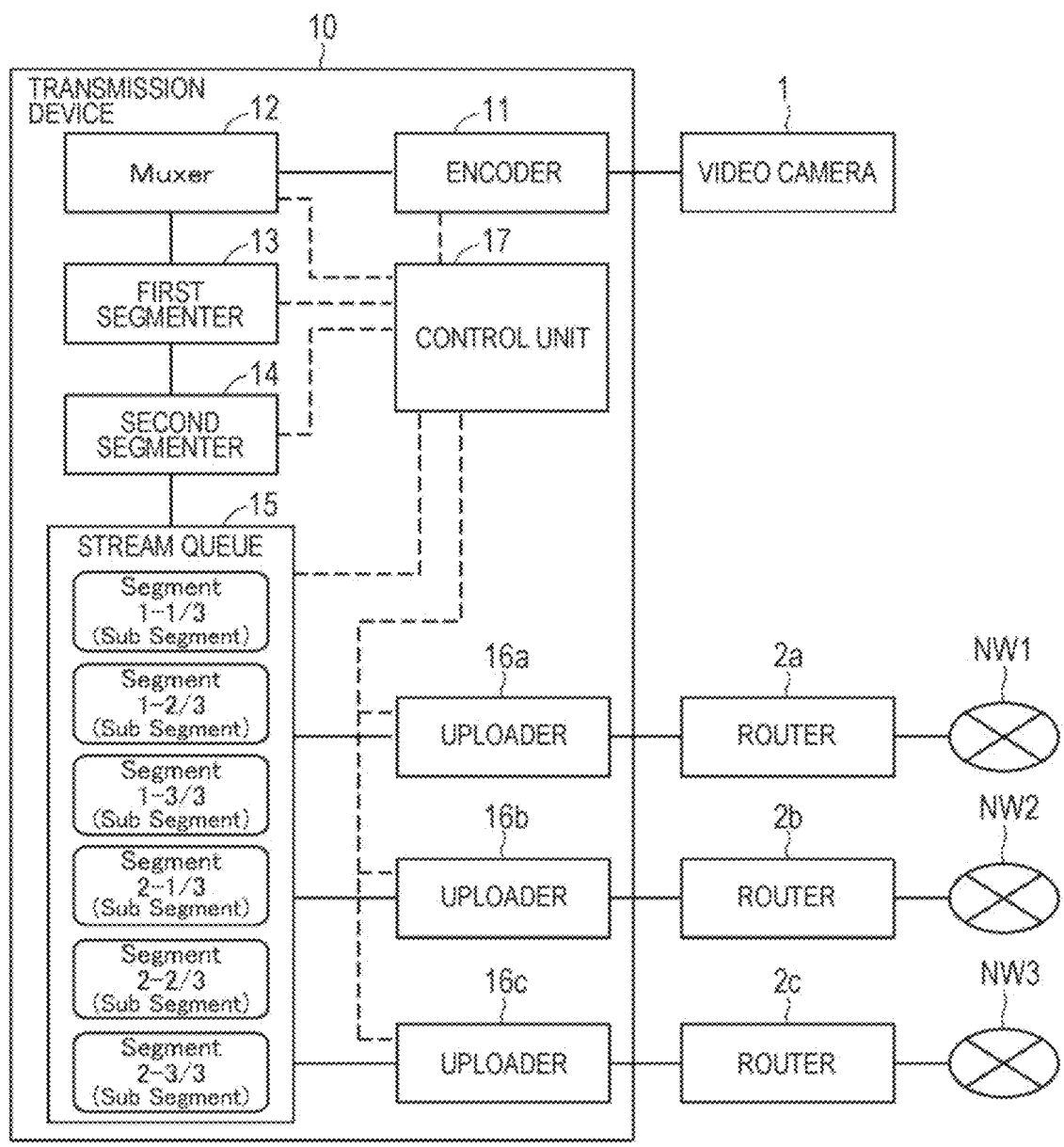
FIG. 3 is a block diagram illustrating the configuration of a transmission device.
Figure 4:
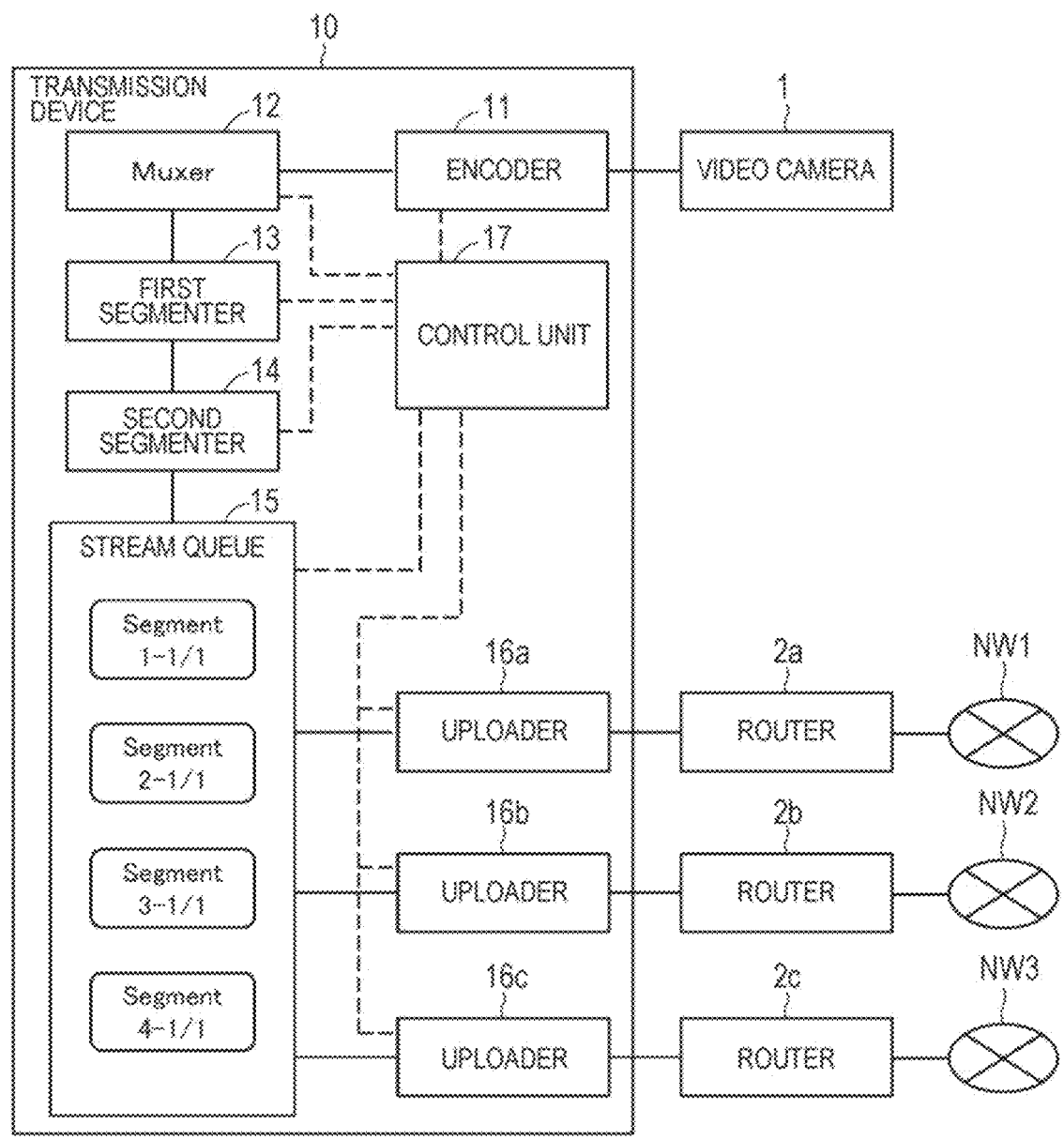
FIG. 4 is a block diagram illustrating the configuration of the transmission device.
Figure 5:
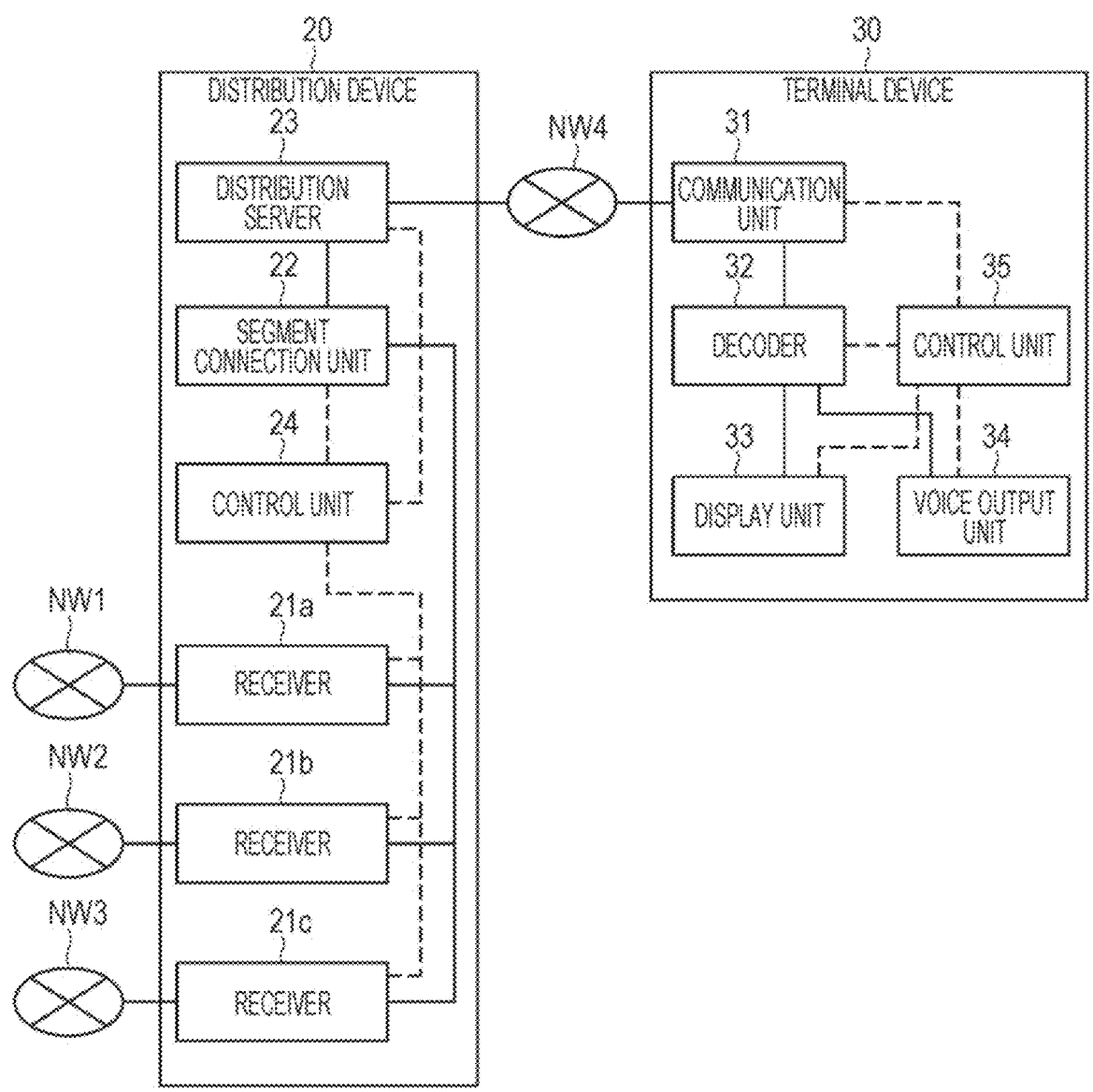
FIG. 5 is a block diagram illustrating the configurations of a distribution device and a terminal device.

The following describes the configuration of the transmission device 10 with reference to FIGS. 3 and 4. The transmission device 10 includes an encoder 11, a Muxer 12, a first segmenter 13, a second segmenter 14, a stream queue 15, uploaders 16a, 16b, and 16c, and a control unit 17. Note that each solid line connecting blocks in FIGS. 3 to 5 illustrates the flow of content data such as segments and sub segments, and each dashed line is a control line illustrating the flow of a control signal or the like.

The encoder 11 encodes video data captured by the externally connected video camera 1 into a video stream of H.264, Divx, or the like. Furthermore, the encoder 11 encodes voice data recorded by a microphone attached to or separated from the video camera 1 into an audio stream of Advanced Audio Coding (AAC), MPEG-1 Audio Layer-3 (MP3), or the like.

The Muxer 12 connects the encoded video stream and audio stream into an MPEG2 transport stream (hereinafter referred to as TS).

The first segmenter 13 divides the TS into a plurality of files in a predetermined length (in the present embodiment, one second). Each file generated by dividing the TS through the first segmenter 13 is referred to as a segment.

Each segment starts with a key frame and is a media file with an extension ".ts" that can be reproduced as a moving image content by itself. The header of the segment includes an encode timing. The encode timing is time information indicating a time at which encode is performed by the encoder 11. The distribution device 20 refers to each encode timing to distribute the segments in the order of earliest time indicated by the encode timing. In addition, segment numbers are added to the segments. The segment number is a value attached to each of segments generated by dividing the TS, for identifying segments and indicating the order of segments. In the format of Segment[N], the segment number is provided in the order of earliest encode timing and incremented one by one to represent the first segment as Segment[1] and the following segments as Segment[2], Segment[3], . . . . The order of the segment numbers matches with the playback order of the segments.

The second segmenter 14 divides a segment into smaller sizes. Divided files generated by the second segmenter 14 are referred to as sub segments. Each sub segment is a file that cannot be played back as a moving image content alone. Each file generated by the second segmenter 14 is stored in the stream queue 15 as needed.

The header of each sub segment includes the encode timing, the segment number, and the sub segment number. The encode timing included in the header of each sub segment is the encode timing of a segment including the sub segment. Thus, the encode timings of a plurality of sub segments included in one segment are all same.

The sub segment number of each sub segment includes a value indicating the number of divisions of sub segments generated by dividing a segment, and a value indicating the order of a place at which the sub segment is positioned in the segment. For example, in a case where two segments (Segment[1] and Segment[2]) are each divided into three sub segments as illustrated with sub segments stored in the stream queue 15 in FIG. 3, Segment[1]-1/3, Segment[1]-2/3, Segment[1]-3/3, Segment[2]-1/3, Segment[2]-2/3, and Segment[2]-3/3 are provided with the value indicating the number of divisions as the denominator and the number indicating the order of the sub segment as the numerator. For example, "Segment[1]-2/3" represents the second sub segment of Segment[1] divided into three sub segments. The distribution device 20 refers to the sub segment number of a received sub segment to check the number of sub segments into which a segment is divided and determine whether or not all sub segments included in the segment are received.

The second segmenter 14 may receive feedback of communication speed information of the networks NW1, NW2, and NW3 from the uploaders 16a, 16b, and 16c, and perform the segment division with, as a reference, the communication speed of a network, which is lowest among the plurality of networks NW1, NW2, and NW3. The division is performed to increase the number of sub segments as the communication speed of a network, which is lowest communication speed among the plurality of networks NW1, NW2, and NW3, is lower, or decrease the number of sub segments as the communication speed is higher.

The second segmenter 14 may perform the segment division in accordance with information of the band (communication speed) of each of the networks NW1, NW2, and NW3. The second segmenter 14 acquires the band information, for example, as described below. A predetermined segment is transmitted from the transmission device 10 to the distribution device 20 through, for example, the network NW1. The distribution device 20 determines band information from the difference between an encode timing included in the transmitted segment and a timing at which the segment is received, and feeds back the information to the transmission device 10. Similarly, the distribution device 20 also feeds back band information related to the networks NW2 and NW3 to the transmission device 10. The transmission device 10 determines the number of divisions of the segment with, as a reference, a band that is most crowded (has a low line speed) in accordance with the band information thus fed back.

Note that the band information may be updated in accordance with the crowded statuses of the networks NW1, NW2, and NW3. Accordingly, the number of divisions of the segment may be determined again in accordance with the updated band information. Furthermore, the transmission device 10 may have a table listing the number of divisions of the segment in accordance with the band information, and the number of divisions of the segment in accordance with the band information may be determined with reference to the table. Furthermore, test data may be transmitted from the transmission device 10 to the distribution device 20 in advance, and the band information before segment transmission may be transmitted from the distribution device 20 to the transmission device 10, thereby performing calibration processing beforehand.

Note that, in a case where the speed of a network is sufficient for transmission in units of segments, a segment may be directly uploaded to the distribution device 20 without being divided. In this case, as illustrated in FIG. 4, the segment is directly stored in the stream queue 15 and provided with the segment number of Segment[N]-1/1. Segment[N]-1/1 indicates that the N-th segment is divided into one sub segment (not divided). Such change of the number of segment divisions in accordance with the network communication speed may be performed in real time during content distribution. Such real-time change can handle change of the network state. Note that the following describes an example in which the segment is uploaded in sub segments from the transmission device 10 to the distribution device 20.

Furthermore, the second segmenter 14 may change the number of divisions in accordance with, for example, the image quality and sound quality of a content. For example, in a case where data is encoded into a moving image having high image quality by the encoder 11, the data has a large size, and thus the number of divisions is increased. For example, in a case where data is distributed as a high image quality content of 4K or the like, the number of divisions is increased. The size of each sub segment decreases as the number of divisions increases, and thus, the sub segment can be uploaded through a network provided by a communication carrier.

The stream queue 15 sequentially stores sub segments generated by dividing a segment (or the segment in a case where the segment is not divided into sub segments).

The uploaders 16a, 16b, and 16c sequentially upload the sub segments stored in the stream queue 15 to the distribution device 20 through the routers 2a, 2b, and 2c and the networks NW1, NW2, and NW3. In the present technology, since the transmission device 10 includes the three uploaders 16a, 16b, and 16c, the number of uploaders is equal to the number of corresponding routers. Note that the number of uploaders and the number of routers are not limited to three. The numbers may be larger or smaller than three as long as the numbers are plural.

The uploaders 16a, 16b, and 16c constantly monitor the speeds of communication between the routers 2a, 2b, and 2c and the networks NW1, NW2, and NW3, and can supply the communication speed information to the second segmenter 14 as a feedback. The second segmenter 14 preferably receives the feedback from the uploaders 16a, 16b, and 16c and changes the number of sub segment divisions in real time. Accordingly, when, for example, decrease of the communication speeds of the networks NW1, NW2, and NW3 occurs during live distribution, delay can be prevented from occurring to sub segment transmission by increasing the number of sub segment divisions to decrease the size of each sub segment. Note that the second segmenter 14 may generate sub segments by dividing a segment into a predetermined size independently from the communication speeds of the networks NW1, NW2, and NW3.

The control unit 17 includes a central processing unit (CPU), a random access memory (RAM), a read only memory (ROM), and the like. The ROM stores, for example, a computer program read and operated by the CPU. The RAM is used as a work memory of the CPU. The CPU controls the entire transmission device 10 and each component thereof by executing various processing in accordance with the computer program stored in the ROM and performing command issuing.

Note that each component included in the transmission device 10 may be achieved by software or achieved by combining a device, a circuit, and the like as dedicated hardware having the function of the software.

[1-1-2. Configuration of Distribution Device]

The following describes the configuration of the distribution device 20 with reference to FIG. 5. The distribution device 20 includes receivers 21a, 21b, and 21c, a sub segment connection unit 22, a distribution server 23, and a control unit 24.

The receivers 21a, 21b, and 21c each receive a sub segment or a segment uploaded from the transmission device 10 through the routers 2a, 2b, and 2c and the networks NW1, NW2, and NW3. In the present technology, since the distribution device 20 includes the plurality of receivers 21a, 21b, and 21c, and the number of the receivers is equal to the number of the corresponding uploaders 16a, 16b, and 16c. Note that, although the number of uploaders, the number of routers, and the number of receivers are three in FIG. 1, the number of receivers may be any number equal to the number of uploaders and the number of routers.

The sub segment connection unit 22 reproduces a segment by connecting sub segments received by the receivers 21a, 21b, and 21c and supplies the segment to the distribution server 23. When having received one of a plurality of sub segments included in a single segment, the sub segment connection unit 22 checks the number of sub segments into which the segment is divided and the order of the sub segment on the basis of the sub segment number. Thus, the sub segment connection unit 22 waits for arrival of all sub segments included in the segment, and performs processing of connecting the sub segments after having checked that all sub segments have arrived. For example, in a case where the single segment of Segment[1] is divided into three sub segments and Segment[1]-3/3 first arrives at the sub segment connection unit 22, the sub segment connection unit 22 performs the connection processing after arrival of the remaining two sub segments of Segment[1]-1/3 and Segment[1]-2/3.

In a case where none of sub segments included in a segment has arrived in a predetermined time after reception of a sub segment included in the previous segment, the sub segment connection unit 22 does not perform the connection processing of the segment including the non-arriving sub segments. The segment not provided with the connection processing waits until arrival of all sub segments, and then is provided with the connection processing after arrival of all sub segments and stored in the distribution server 23. In other words, a segment, any one of sub segments of which has not arrived is not stored in the distribution server 23 until all sub segments arrive. The segment not stored in the distribution server 23 is not played back as a content on the terminal device 30. This will be described later in detail.

Note that, in a case where not a sub segment but a segment is uploaded from the transmission device 10, the sub-segment connection processing is not performed, but the segment is directly stored in the distribution server 23.

Upon the segment storage, the distribution server 23 updates a play list. Then, when having received, from the terminal device 30, a request for transmission of the play list, the distribution server 23 replies the play list to the terminal device 30 in accordance with the transmission request. The play list includes a uniform resource locator (URL) indicating the storage position of a segment.

Once a segment is stored in the distribution server 23, the distribution server 23 refers to the segment number of the stored segment, and writes a URL indicating the position of the stored segment to the play list in the order of encode timing. Accordingly, the play list constantly includes the URLs of segments in the order of encode timing, in other words, the order of playback.

FIG. 6 illustrates an exemplary play list updated by the distribution server 23. The play list is an index file with an extension ".m3u8" in the HLS, and in this example, lists the URLs of Segment[1], Segment[2], and Segment[3] in the order of encode timing. The play list in FIG. 6 is for a case where the entire stream is divided into three segments of one second. Note that "#EXTM3U" is a header, and "#EXTINF: 1" is information indicating that the time length of Segment is one second.

As described above, in a case where any one of sub segments included in a segment does not arrive at the distribution device 20, the segment including the non-arriving sub segment is not stored in the distribution server 23, and thus the URL of the segment is not written to the play list. Note that transmission error is detected by the transmission device 10 to perform TCP retransmission control processing for the sub segment not arriving at the distribution device 20, and finally, all sub segments are uploaded to the distribution device 20.

The control unit 24 includes a CPU, a RAM, a ROM, and the like. The CPU controls the entire distribution device 20 and each component thereof by executing various processing in accordance with a computer program stored in the ROM and performing command issuing.

[1-1-3. Configuration of Terminal Device]

The following describes the configuration of the terminal device 30 with reference to FIG. 5. The terminal device 30 includes a communication unit 31, a decoder 32, a display unit 33, a voice output unit 34, and a control unit 35.

The communication unit 31 is a communication module configured to transfer a play list transmission request to the distribution device 20 by a HTTP GET request and receive a play list transmitted from the distribution device 20. Furthermore, the communication unit 31 receives a segment downloaded from the distribution server 23 through access to a URL written in the received play list.

The decoder 32 performs decode processing on an encoded segment to generate video data that can be played back on a browser.

The display unit 33 is a display device achieved by, for example, a liquid crystal display (LCD), a plasma display panel (PDP), an organic electro luminescence (EL) panel, or the like. The display unit 33 displays, for example, a video included in a content transmitted from the transmission device 10, and a user interface and a menu screen of the terminal device 30.

The voice output unit 34 is, for example, a speaker or an earphone jack to be connected with an earphone, which is configured to output voice included in a content transmitted from the transmission device 10.

The control unit 35 includes a CPU, a RAM, and a ROM. The CPU controls the entire terminal device 30 and each component thereof by executing various processing in accordance with a computer program stored in the ROM and performing command issuing. Furthermore, the CPU also performs, for example, operation processing of a browser for playing back a moving image of a content at the display unit 33.

Note that the communication unit 31 and the decoder 32 included in the terminal device 30 may be achieved by software or achieved by combining a device, a circuit, and the like as dedicated hardware having the function of the software.

[1-2. Processing Performed by Content Distribution System]

[1-2-1. Upload to Distribution Device]

Figure 7:
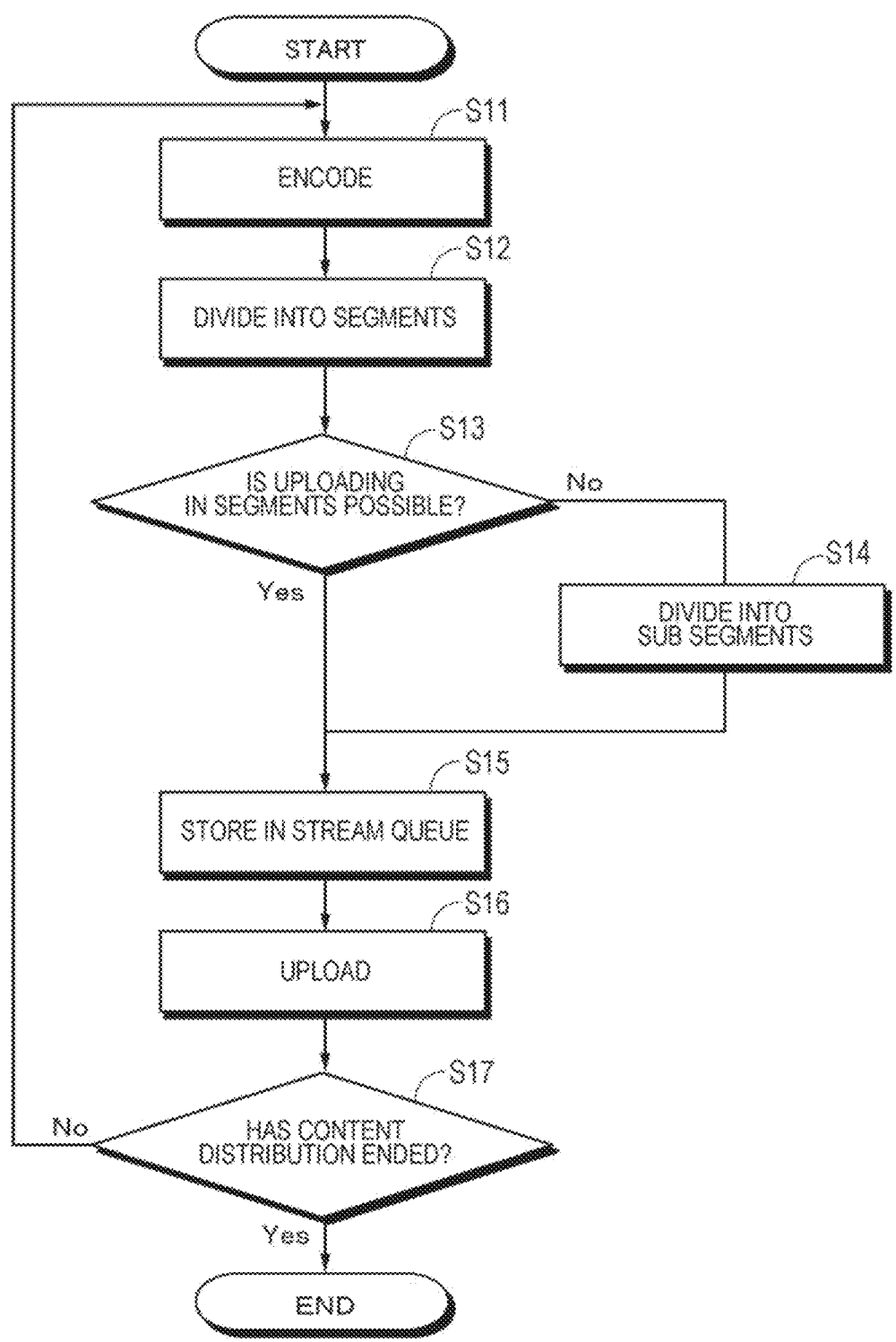
FIG. 7 is a flowchart illustrating the process of upload from the transmission device to the distribution device.

The following describes content distribution by the content distribution system 100 with reference to FIG. 7. The description will be first made on upload from the transmission device 10 to the distribution device 20.

First, content data including live video, live voice, and the like and captured by the video camera 1 is provided with encode processing by the encoder 11 at step S11. Subsequently at step S12, the content data is divided into segments by the first segmenter 13.

Subsequently at step S13, the control unit 17 determines whether or not each segment of the content data can be transmitted to the distribution device 20. This determination is performed through comparison of the size of the segment with the communication speed of a network, which is lowest communication speed among the plurality of networks NW1, NW2, and NW3, or a predetermined threshold. In a case where the size of the segment is smaller than the lowest communication speed of the networks NW1, NW2, and NW3 or the predetermined threshold, the process proceeds to step S15 (Yes at step S13), and the segment is stored in the stream queue 15 without being divided.

Meanwhile, in a case where the size of the segment is larger than the lowest communication speed of the networks NW1, NW2, and NW3 or the predetermined threshold, the process proceeds to step S14 (No at step S13). Then, the segment is divided into sub segments by the second segmenter 14 at step S14, and stored in the stream queue 15 at step S15. Note that the following description will be made on an example in which sub segments are stored in the stream queue 15.

Subsequently at step S16, the sub segments stored in the stream queue 15 are sequentially uploaded in the order of encode timing from the uploaders 16a, 16b, and 16c to the distribution device 20 through the routers 2a, 2b, and 2c and the networks NW1, NW2, and NW3. Then, at step S17, it is checked whether content distribution has ended, and processing is continued until the distribution ends (No at step S16).

When the sub segments are uploaded from the uploaders 16a, 16b, and 16c to the distribution device 20, the sub segments are transmitted in parallel by using the plurality of (in the present embodiment, three) routers 2a, 2b, and 2c and the networks NW1, NW2, and NW3. Since the transmission is performed in parallel through a plurality of networks in this manner, not through a single network, the content transmission is not delayed nor disconnected when any of the networks becomes unstable or disconnected.

When sub segments are transmitted through a plurality of networks, the sub segments may be preferentially transmitted through a network having the highest communication speed among the plurality of networks. Accordingly, the sub segments can be transmitted to the distribution device 20 faster.

Furthermore, a network with which communication is disconnected during sub segment transmission may be no longer used in the following transmission. Accordingly, the sub segment transmission can be performed more stably.

[1-2-2. Update of Play List]

Figure 8:
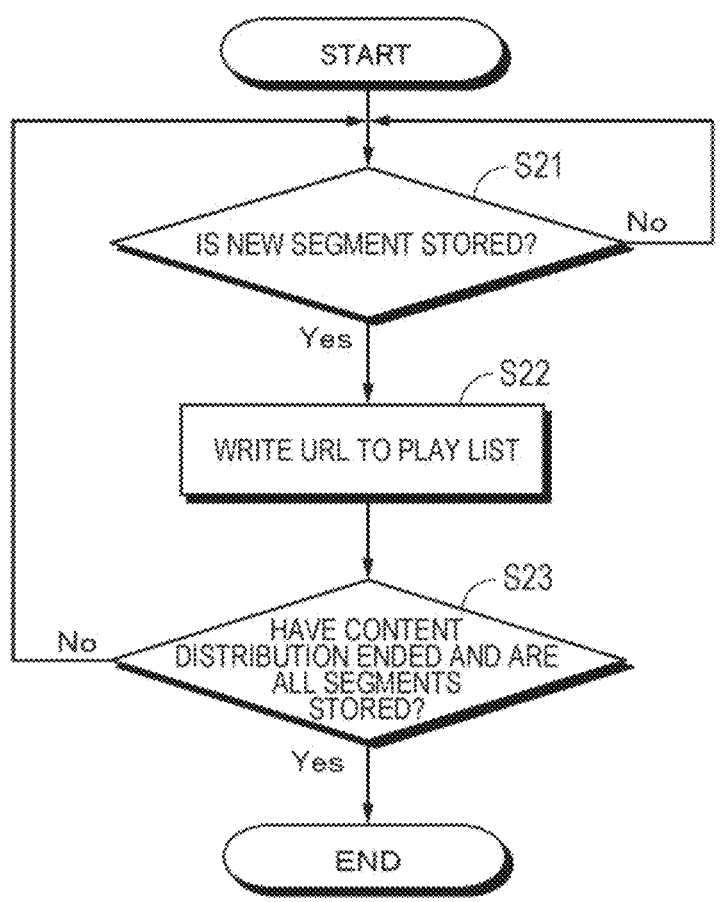
FIG. 8 is a flowchart illustrating the process of update of the play list.

The following describes play list update processing performed at the distribution device 20 with reference to FIG. 8. First at step S21, in a case where a new segment is stored in the distribution server 23, the distribution server 23 updates a play list by writing at step S22, to the play list, a URL indicating the storage position of the stored segment (Yes at step S21).

The number of segment URLs written to the play list in advance is set to the distribution device 20. For example, "when the first segment is Segment[N], the URLs of segments up to Segment[N+2] are written (in this case, three URLs are written in total)". Accordingly, in a case where the first segment in the play list is Segment[1], and the three segments of Segment[1], Segment[2], and Segment[3] are stored in the distribution server 23, the URLs of Segment[1], Segment[2], and Segment[3] are written to the play list and transmitted to the terminal device 30. Furthermore, in a case where the first segment of the play list is Segment[1], and Segment[1] and Segment[3] are stored in the distribution server 23 but Segment[2] is not stored, the URLs of Segment[1] and Segment[3] are written to the play list and transmitted to the terminal device 30.

Furthermore, in a case where the URLs of segments up to Segment[3] are written to the play list, the URLs of Segment[4], Segment[5], and Segment[6] are written to the next play list with the first segment as Segment[4].

Note that the number of URLs written to the play list sets in advance is not limited to three, but may be larger or smaller than three.

Then, it is determined at step S23 whether the content distribution has ended and all segments are stored in the distribution server 23. In a case where, the content distribution ends and all segments are stored in the distribution server 23, the processing ends (Yes at step S23). Meanwhile, in a case where the content distribution is yet to end, the process returns to step S21, and a segment URL is written to the play list each time a new segment is stored in the distribution server 23 (No at step S23).

[1-2-3. First Exemplary Distribution to Terminal Device]

Figure 9:
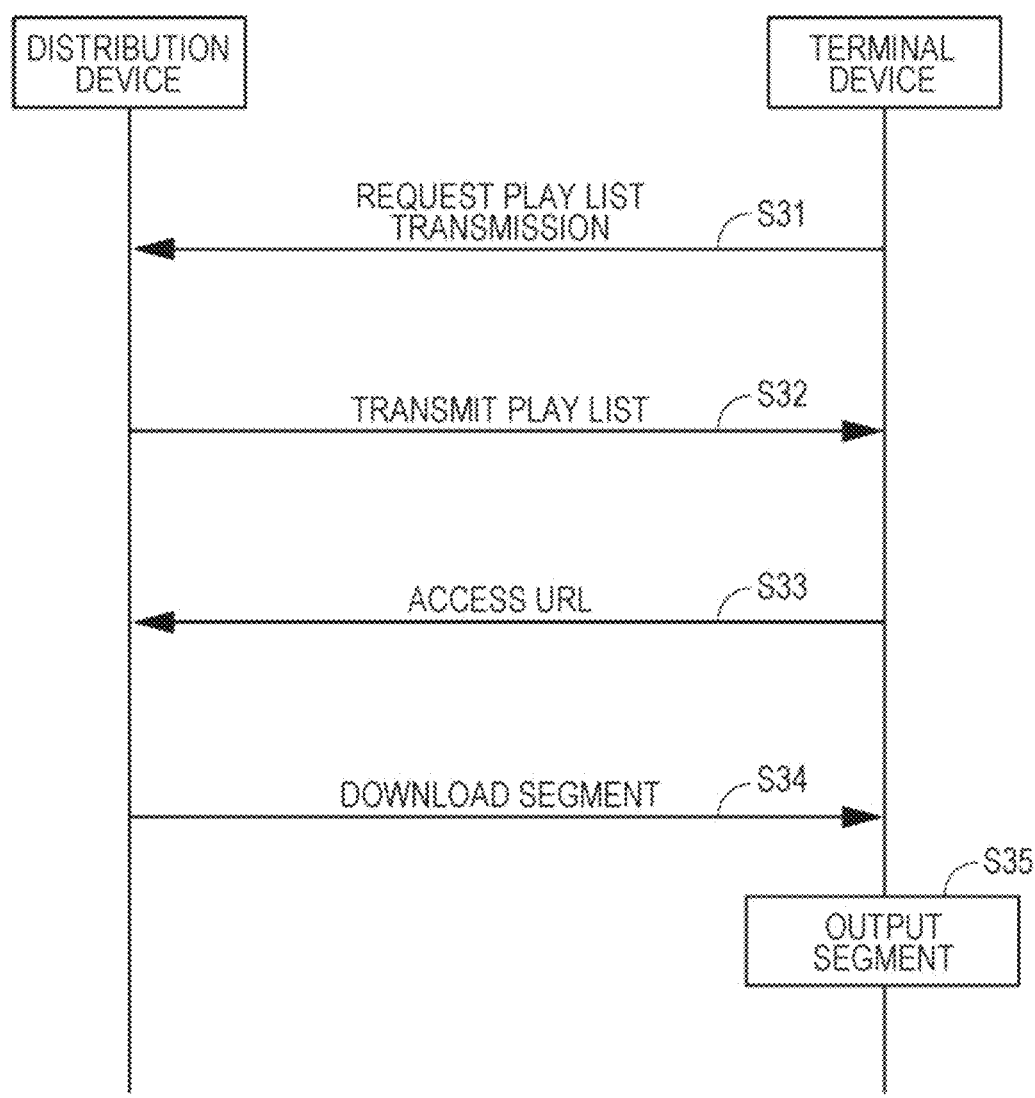
FIG. 9 is a sequence diagram illustrating the process of distribution from the distribution device to the terminal device.

The following describes, with reference to FIG. 9, processing in which the distribution device 20 distributes a content to the terminal device 30. The description will be first made on a case where, when a play list transmission request arrives from the terminal device 30, all segments, the URLs of which are to be written to a play list to be transmitted in accordance with the transmission request are stored in the distribution server 23.

First at step S31, the terminal device 30 requests play list transmission for the distribution device 20. Having received the transmission request, the distribution device 20 transmits the play list to the terminal device 30 at step S32. For example, in a case where the URLs of three segments are set to be written to the play list, the distribution device 20 transmits the play list to the terminal device 30 after the three segments are stored in the distribution server 23, and the URLs of the three segments are written to the play list. The following description assumes that the URLs of the three segments are set to be written.

Subsequently at step S33, the terminal device 30 accesses the three URLs written to the play list. Then, at step S34, the terminal device 30 downloads the three segments from the distribution device 20. Then, at step S35, the terminal device 30 performs predetermined processing such as decode processing on the three segments, and displays the segments as live video on the display unit 33 and outputs voice from the voice output unit 34.

The processing at steps S31 to 35 is repeated until the live distribution ends.

[1-2-4. Second Exemplary Distribution to Terminal Device]

The following describes a case where there is a segment not arriving at the distribution server 23. The description is made on an example in which the URLs of three segments are set to be written to a play list, and Segment[1] and Segment[3] are stored in the distribution server 23 but Segment[2] is not stored therein yet when a play list transmission request is arrived from the terminal device 30.

First at step S31, the terminal device 30 requests play list transmission for the distribution device 20. Having received the transmission request, the distribution device 20 transmits the play list to the terminal device 30 at step S32. At this time, since Segment[1] and Segment[3] are stored in the distribution server 23 but Segment[2] is not stored therein yet, the URL of Segment[2] is not written in the play list. Thus, the distribution device 20 transmits the play list in which the URLs of Segment[1] and Segment[3] are written to the terminal device 30. Accordingly, Segment[2] is excluded from real-time live distribution.

Subsequently at step S33, the terminal device 30 accesses the two URLs written to the play list. Then, at step S34, the terminal device 30 downloads the two segments of Segment [1] and Segment[3]. Then, at step S35, the terminal device 30 performs predetermined processing such as decode processing on Segment[1] and Segment[3], and displays the segments as live video on the display unit 33 and outputs voice from the voice output unit 34.

In this case, since Segment[2] is not stored in the distribution server 23, frame dropping for the length of Segment [2] occurs after playback of Segment[1], and thereafter Segment[3] is played back. In other words, in a case where Segment[2] is not stored, distribution of Segment[2] and the following segments is not stopped, but the next segment of Segment[3] is played back with Segment[2] as frame dropping. In a case where the length of Segment[2] is one second, frame dropping of one second occurs. Accordingly, when Segment[2] has not arrived at the distribution device 20, it is possible to prevent degradation of the real-time characteristic due to delay for a wait time until arrival of Segment[2] at the distribution device 20, thereby maintaining the real-time live distribution. Since a segment is a file that can be played back as a moving image content by itself as described above, some missing segments included in a TS can be treated as frame dropping, and the TS as a whole can be played back.

Note that frame dropping is a phenomenon in which part of transmitted data is not played back so that voice and image become discontinuous for a short time when a moving image is played back. When frame dropping occurs, a moving image becomes not smooth for the time of the frame dropping.

Subsequently, until playback of Segment[1], frame dropping for the length of Segment[2], and playback of Segment [3] end, the terminal device 30 requests transmission of a play list to which the URLs of the next three segments of Segment[4] and the following segments are written. Then, the terminal device 30 accesses the URLs written to the play list, downloads the segments, performs predetermined processing on the segments, displays the segments as live video on the display unit 33, and outputs voice from the voice output unit 34. This processing is repeated until the live distribution ends.

[1-2-5. Third Exemplary Distribution to Terminal Device]

The following describes another example in which the URLs of three segments are set to be written to a play list, and Segment[1] is stored in the distribution server 23 but Segment[2] and Segment[3] are not stored therein when a play list transmission request is arrived from the terminal device 30.

First at step S31, the terminal device 30 requests play list transmission for the distribution device 20. Having received the transmission request, the distribution device 20 transmits the play list to the terminal device 30 at step S32. At this time, since Segment[1] is stored in the distribution server 23 but Segment[2] and Segment[3] are not stored therein, the distribution device 20 transmits the play list in which only the URL of Segment[1] is written to the terminal device 30. Accordingly, Segment[2] and Segment[3] are excluded from real-time live distribution.

Subsequently, the terminal device 30 accesses the one URL written to the play list at step S33, and downloads the one segment of Segment[1] at step S34. Then, the terminal device 30 performs predetermined processing such as decode processing on Segment[1], and displays the segment as live video on the display unit 33 and outputs voice from the voice output unit 34.

In this case, since Segment[2] and Segment[3] are not stored in the distribution server 23, frame dropping for the length of Segment[2] occurs after playback of Segment[1], and subsequently frame dropping occurs for the length of Segment[3]. In a case where the lengths of Segment[2] and Segment[3] are one second, frame dropping for two seconds occurs in total. Accordingly, when Segment[2] and Segment [3] are not stored in the distribution server 23, it is possible to prevent degradation of the real-time characteristic due to delay for a wait time until Segment[2] and Segment[3] are stored in the distribution server 23, thereby maintaining the real-time live distribution.

Subsequently at step S31 again, the terminal device 30 requests transmission for a play list in which the URLs of the next three segments are written until playback of Segment [1] ends. Then, at step S32, the distribution device 20 transmits the play list in which the URLs of the three segments are written to the terminal device 30. In this case, in a case where Segment[2] has not arrived at the distribution device 20 but Segment[3] and the following segments have arrived, the play list in which the URLs of Segment[3], Segment[4], and Segment5 are written is transmitted.

Then, the terminal device 30 accesses the three URLs written to the play list at step S33, and downloads the segments at step S34. Then, at step S35, the terminal device 30 performs predetermined processing on the segments, and outputs the segments as live video from the display unit 33 and the voice output unit 34. The processing at steps S31 to 34 is repeated until the live distribution ends.

Meanwhile, in a case where the three segments of Segment[2], Segment[3], and Segment[4] to be written to the play list are not stored in the distribution server 23 yet when the play list transmission request arrives from the distribution device 20, no transmission of the play list may be performed until Segment[1] and the following segments are stored in the distribution server 23.

[1-2-6. Distribution of Past Content]

The following describes a case where a past content that is already live distributed is distributed as video on demand (VOD), recorded broadcast, or the like after the live distribution ends. Any segment not stored in the distribution server 23 during the live distribution is stored therein upon arrival at the distribution server 23 during the live distribution or after the live distribution ends. Then, when the segment is stored in the distribution server 23, the URL thereof is written to the play list, thereby updating the play list.

Then, when a viewer performs a predetermined operation on the terminal device 30 to watch the past content after the live distribution ends, the terminal device 30 requests play list transmission for the distribution device 20. Having received the transmission request, the distribution device 20 transmits the play list to the terminal device 30. At this time, since all segments including any segment not stored in the distribution server 23 during the live distribution are stored in the distribution server 23, the distribution device 20 transmits the play list in which the URLs of all segments are written to the terminal device 30. Accordingly, the terminal device 30 can access the URLs of all segments and play back all segments.

Furthermore, since all segments included in the TS are already stored in the distribution server 23 in a case of the past content distribution, the viewer can select a playback start segment by using the play list. Since the URLs of all segments included in the TS are written in the play list transmitted from the distribution server 23, the viewer can select an optional segment as the playback start segment through, for example, an input unit of the terminal device 30. Then, the terminal device 30 requests for distribution of the segment selected by the viewer, and downloads the selected playback start segment and any following segment. Then, the terminal device 30 performs predetermined processing such as decode processing on the segments, and displays the segments as live video on the display unit 33 and outputs voice from the voice output unit 34.

Figure 10:
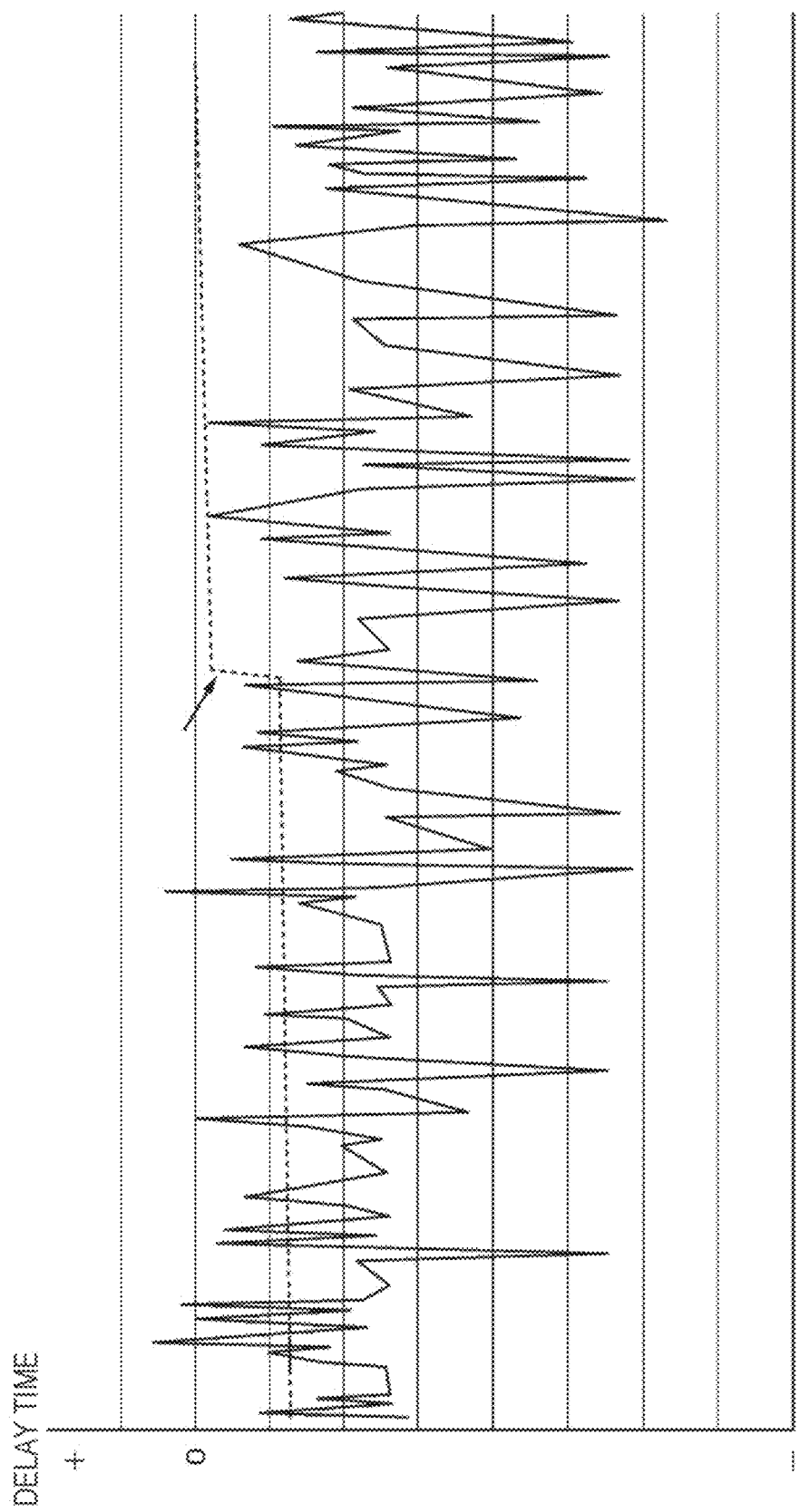
FIG. 10 is a graph illustrating a result of comparison between upload through a single network and upload through a parallel network.

[1-3. Effect of parallel upload] FIG. 10 is a graph illustrating a result of an experiment of comparison between a case where data is transmitted through a single network and a case where the same data is transmitted in parallel through four networks. The solid line illustrates a result of the parallel transmission, and the dashed line illustrates a result of the single network transmission. The vertical axis represents a delay time (seconds). It is illustrated that delay occurs to communication as the value on the vertical axis increases.

Conditions of the comparison experiment are as follows.
Moving image bit rate: 10 Mbps (bits per second)
Segment length (time): one second
Upload time: five minutes
Router: LTE router
Upload communication speed (per LTE router): 18.73 Mbps
Time slot: about four o'clock in the afternoon on weekday
Place: Tokyo As illustrated in the graph in FIG. 10, when retransmission due to a packet loss occurs during the single network transmission as indicated by the arrow, delay due to the retransmission affects the following transmission, and delay accumulates in the following communication.

In a case of the parallel transmission through the four networks, any local delay does not accumulate nor affect the following transmission. Thus, it is possible to perform the parallel transmission while maintaining the real-time characteristic without delay accumulation in the data transmission.

The content distribution according to the present embodiment is performed as described above. The present technology is particularly useful for distribution of contents such as sport live broadcast, music live broadcast, and the like for which the real-time characteristic is requested. Furthermore, a larger amount of data is needed for contents such as 4K and virtual reality (VR) than for a normal video content, and thus the present technology is also useful for content distribution of such a scheme.

Furthermore, the present technology is also applicable to distribution of a 4K live moving image while moving outdoor, and distribution of a VR live moving image using a head mounted display (HMD) or the like. The sizes of contents of the 4K moving image and the VR live moving image are large, and thus it is thought that the present technology is particularly useful for distribution of the contents.

In addition, the present technology is applicable to live distribution while moving by using a wide-angle action camera. The action camera is a small-sized digital video camera 1 optimized mainly for capturing an image of a scene during an outdoor sport, and can be attached to a human body, a bicycle, a vehicle, an animal, a surfboard, or the like, for example, by using various accessories.

Furthermore, since parallel upload is performed through a plurality of networks of a plurality of carriers, resistance to a handover during movement can be improved. The handover is switching of mobile stations such as base stations during movement, the base stations being configured to perform communication with smartphones and cellular phones.

2. Exemplary Applications

The technology according to the present disclosure is applicable to various products. For example, the technology according to the present disclosure may be applied to an operation room system. In the application to an operation room system, images and videos acquired in an operation room can be uploaded to the distribution device 20 through networks and distributed to an external device such as the terminal device 30.

Figure 11:
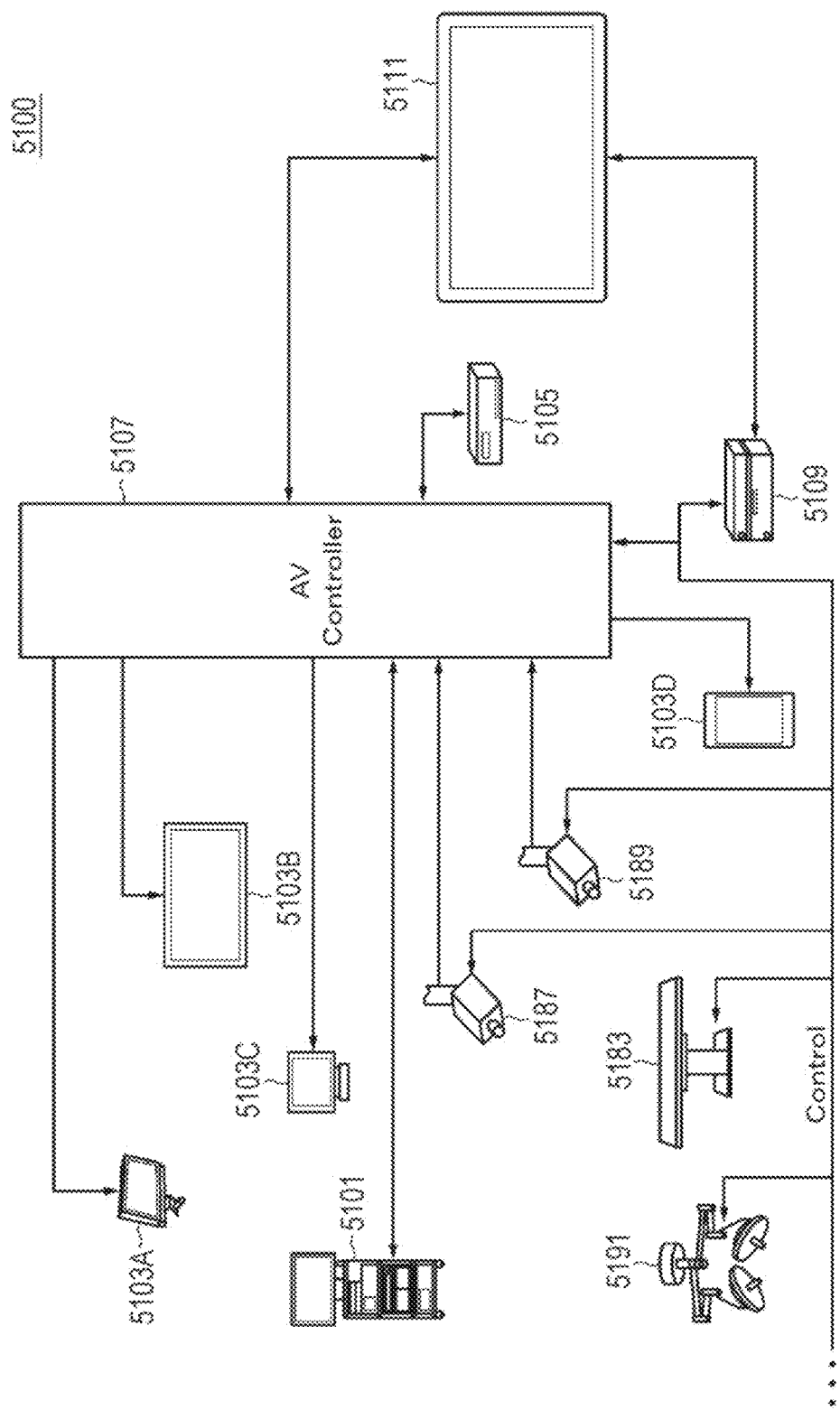
FIG. 11 is a diagram schematically illustrating the entire configuration of an operation room system.

FIG. 11 is a diagram schematically illustrating the entire configuration of an operation room system 5100 to which the technology according to the present disclosure is applicable. As illustrated in FIG. 11, the operation room system 5100 includes devices installed in an operation room and connected with each other in a cooperative manner through an audio-visual controller (AV controller) 5107 and an operation room control device 5109.

Various devices may be installed in the operation room. FIG. 11 exemplarily illustrates various devices 5101 for an endoscopic operation, a ceiling camera 5187 provided on the ceiling of the operation room and configured to capture an image of the hands of an operator, an operation room camera 5189 provided on the ceiling of the operation room and configured to capture an image of the situation of the entire operation room, a plurality of display devices 5103A to 5103D, a recorder 5105, a patient bed 5183, and an illumination device 5191.

Among these devices, the devices 5101 belong to an endoscopic operation system 5113 as described later, and include an endoscope, a display device configured to display an image captured by the endoscope, and the like. Each device belonging to the endoscopic operation system 5113 is also referred to as a medical instrument. Meanwhile, the display devices 5103A to 5103D, the recorder 5105, the patient bed 5183, and the illumination device 5191 are devices provided to, for example, the operation room separately from the endoscopic operation system 5113. These devices not belonging to the endoscopic operation system 5113 are also referred to as non-medical instruments. The audio-visual controller 5107 and/or the operation room control device 5109 controls operation of these medical instruments and non-medical instruments in cooperation.

The audio-visual controller 5107 controls overall processing related to image display at the medical instruments and the non-medical instruments. Specifically, among the devices included in the operation room system 5100, the devices 5101, the ceiling camera 5187, and the operation room camera 5189 may be devices (hereinafter also referred to as emission source devices) having a function of emitting information (hereinafter also referred to as display information) to be displayed in an operation. Furthermore, the display devices 5103A to 5103D may be devices (hereinafter also referred to as output destination devices) to which the display information is output. Furthermore, the recorder 5105 may be a device corresponding to the emission source devices and the output destination devices. The audio-visual controller 5107 controls the operations of the emission source devices and the output destination devices to acquire the display information from the emission source devices and transmit the display information to the output destination devices for displaying or recording. Note that the display information includes various images captured in an operation, various kinds of information (for example, patient body information, past examination results, information regarding an operative method, and the like) related to the operation, and the like.

Specifically, the devices 5101 can transmit, as the display information to the audio-visual controller 5107, information regarding an image of an operation site in the body cavity of the patient, which is captured by the endoscope. Furthermore, the ceiling camera 5187 can transmit, as the display information, information regarding an image of the hands of the operator captured by the ceiling camera 5187. Furthermore, the operation room camera 5189 can transmit, as the display information, information regarding an image illustrating the situation of the entire operation room, which is captured by the operation room camera 5189. Note that, in a case where the operation room system 5100 includes any other device having an image capturing function, the audio-visual controller 5107 may acquire, as the display information from the other device, information regarding an image captured by the other device.

In addition, for example, information regarding these images captured in the past is recorded in the recorder 5105 by the audio-visual controller 5107. The audio-visual controller 5107 can acquire, as the display information, this information regarding images captured in the past from the recorder 5105. Note that various kinds of information related to the operation may be recorded in the recorder 5105 in advance.

The audio-visual controller 5107 displays the acquired display information (in other words, images captured in the operation, and various kinds of information related to the operation) on at least one of the display devices 5103A to 5103D as the output destination devices. In the illustrated example, the display device 5103A is a display device suspended from the ceiling of the operation room, the display device 5103B is installed on the wall surface of the operation room, the display device 5103C is installed on a desk in the operation room, and the display device 5103D is a mobile device (for example, a tablet personal computer (PC)) having a display function.

Furthermore, although not illustrated in FIG. 11, the operation room system 5100 may include a device outside of the operation room. Examples of the device outside of the operation room include a server connected with networks established inside and outside of a hospital, a PC used by a medical staff, a projector installed in a conference room of the hospital, and the like. In a case where such an external device is outside of the hospital, the audio-visual controller 5107 can display the display information on a display device at another hospital through a television conference system or the like for remote medical care.

The operation room control device 5109 controls overall processing other than processing related to image display at a non-medical instrument. For example, the operation room control device 5109 controls drive of the patient bed 5183, the ceiling camera 5187, the operation room camera 5189, and the illumination device 5191.

The operation room system 5100 is provided with an integrated operation panel 5111, and a user can provide an image display instruction to the audio-visual controller 5107 through the integrated operation panel 5111, and provide an instruction on the operation of the non-medical instrument to the operation room control device 5109. The integrated operation panel 5111 is achieved by a touch panel on the display surface of a display device.

Figure 12:
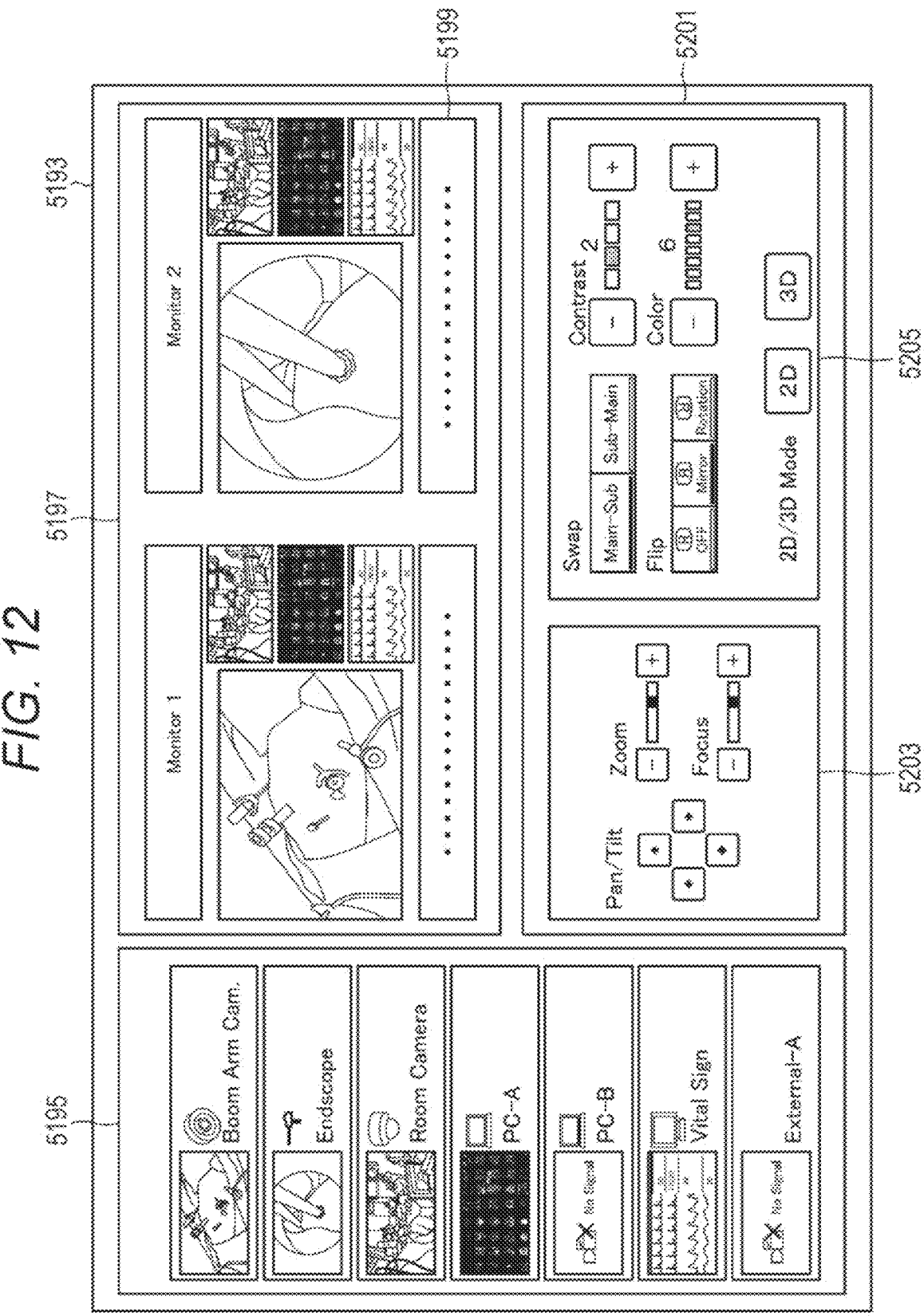
FIG. 12 is a diagram illustrating exemplary display on an operation screen of an integrated operation panel.

FIG. 12 is a diagram illustrating exemplary display on an operation screen of the integrated operation panel 5111. FIG. 12 exemplarily illustrates an operation screen corresponding to a case where the operation room system 5100 is provided with two display devices as output destination devices. As illustrated in FIG. 12, an operation screen 5193 includes a transmission source selection region 5195, a preview region 5197, and a control region 5201.

The transmission source selection region 5195 displays a transmission source device included in the operation room system 5100 in association with a thumbnail screen indicating the display information held by the transmission source device. The user can select the display information to be displayed on the display devices from among the transmission source devices displayed in the transmission source selection region 5195.

The preview region 5197 displays preview of screens displayed on the two display devices (Monitor1 and Monitor2) as the output destination devices. In the illustrated example, four images are displayed in PinP at each display device. These four images correspond to the display information transmitted from a transmission source device selected from the transmission source selection region 5195. One of the four images is displayed in a relatively large size as a main image, and the remaining three images are displayed in relatively small sizes as sub images. The user can interchange the main image with a sub image by selecting a region in which the four images are each displayed as appropriate. Furthermore, a status display region 5199 is provided below the regions in which the four images are displayed, and a status (for example, the elapsed time of the operation, body information of the patient, and the like) related to the operation can be displayed in the region as appropriate.

The control region 5201 includes a transmission source operation region 5203 in which a graphical user interface (GUI) component for performing an operation on an emission source device is displayed, and an output destination operation region 5205 in which a GUI component for performing an operation on an output destination device is displayed. In the illustrated example, the transmission source operation region 5203 includes GUI components for performing various operations (panning, tilt, and zoom) on a camera of an emission source device having an image capturing function. The user can operate the operation of the camera of the emission source device by selecting these GUI components as appropriate. Note that, although not illustrated, in a case where an emission source device selected in the transmission source selection region 5195 is a recorder (in other words, in a case where an image recorded in the recorder in the past is displayed in the preview region 5197), the transmission source operation region 5203 can include GUI components for performing operations such as playback, stop, rewind, and fast forward of the image.

Furthermore, the output destination operation region 5205 includes GUI components for performing various operations (swap, flip, color adjustment, contrast adjustment, and switching between 2D display and 3D display) on display at a display device as an output destination device. The user can operate display at the display device by selecting these GUI components as appropriate.

Note that the operation screen displayed on the integrated operation panel 5111 is not limited to the illustrated example, but the user may be able to input, through the integrated operation panel 5111, an operation on each device that can be controlled by the audio-visual controller 5107 and the operation room control device 5109 included in the operation room system 5100.

Figure 13:
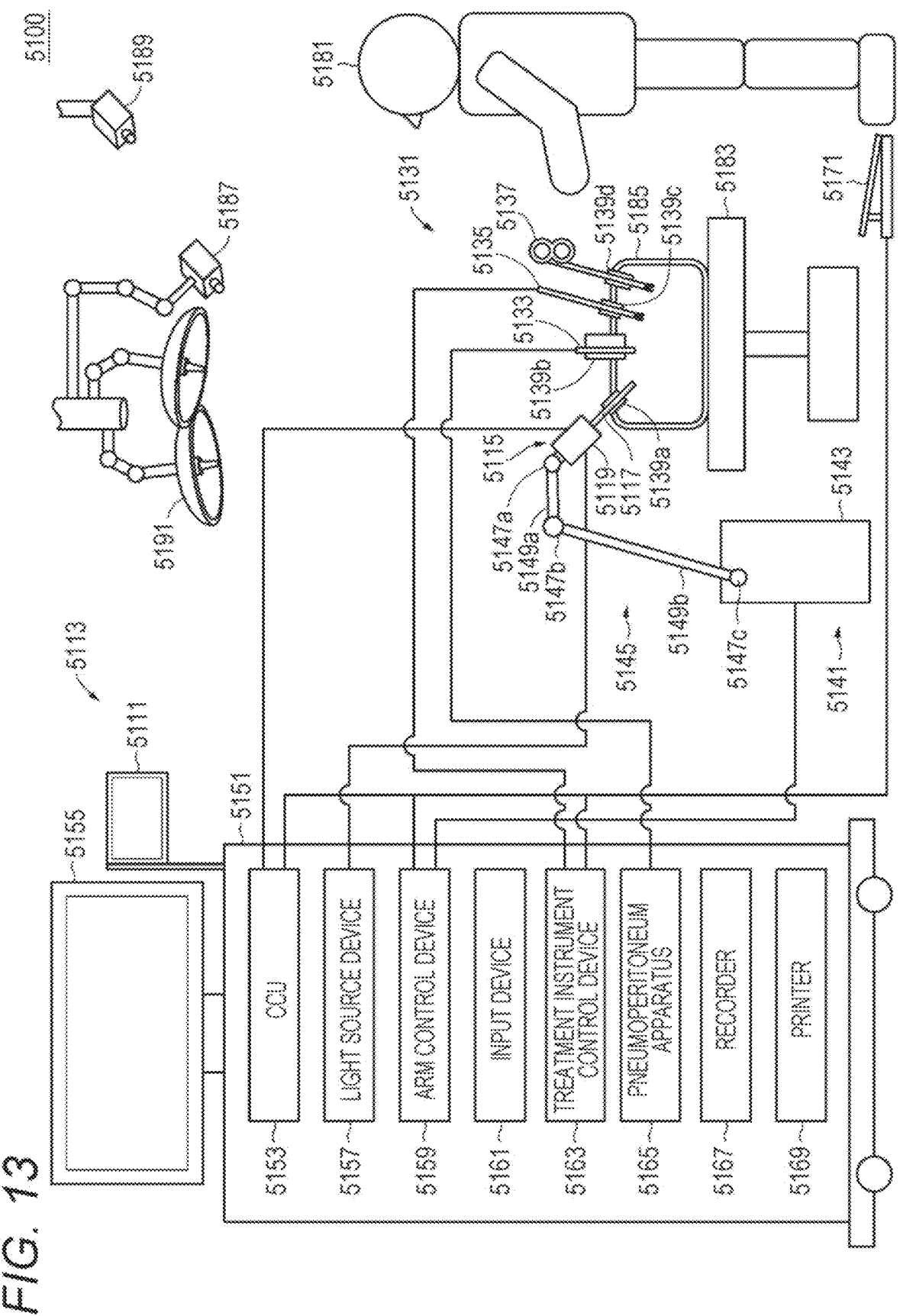
FIG. 13 is a diagram illustrating an exemplary situation of an operation to which the operation room system is applied.

FIG. 13 is a diagram illustrating an exemplary situation of an operation to which the above-described operation room system is applied. The ceiling camera 5187 and the operation room camera 5189 are provided on the ceiling of the operation room, and can capture images of the hands of an operator (doctor) 5181 performing treatment on an affected part of a patient 5185 on the patient bed 5183, and the situation of the entire operation room. The ceiling camera 5187 and the operation room camera 5189 can have, for example, a magnification adjustment function, a focal length adjustment function, and an image capturing direction adjustment function. The illumination device 5191 is provided on the ceiling of the operation room and irradiates at least the hands of the operator 5181 with light. The illumination device 5191 can adjust, for example, the quantity, wavelength (color), and the direction of irradiation light as appropriate.

As illustrated in FIG. 11, the endoscopic operation system 5113, the patient bed 5183, the ceiling camera 5187, the operation room camera 5189, and the illumination device 5191 are connected with each other in a cooperative manner through the audio-visual controller 5107 and the operation room control device 5109 (not illustrated in FIG. 13). The integrated operation panel 5111 is provided in the operation room, and as described above, the user can operate these devices in the operation room through the integrated operation panel 5111 as appropriate.

The following describes the configuration of the endoscopic operation system 5113 in detail. As illustrated, the endoscopic operation system 5113 includes an endoscope 5115, other operation instruments 5131, a support arm device 5141 supporting the endoscope 5115, and a cart 5151 on which various devices for an endoscopic operation are mounted.

In the endoscopic operation, instead of cutting the abdominal wall to open the abdomen, a plurality of tubular puncture instruments called troca 5139a to 5139d are punctured into the abdominal wall. Then, a lens barrel 5117 of the endoscope 5115 and the other operation instruments 5131 are inserted into the body cavity of the patient 5185 through the troca 5139a to 5139d. In the illustrated example, a pneumoperitoneum tube 5133, an energy treatment instrument 5135, and forceps 5137 as the other operation instruments 5131 are inserted into the body cavity of the patient 5185. Furthermore, the energy treatment instrument 5135 is a treatment instrument for performing incision and detachment of a tissue, sealing of a blood vessel, or the like through high frequency current application or ultrasonic wave vibration. However, the illustrated operation instruments 5131 are merely exemplary, and the operation instruments 5131 may be various operation instruments typically used in the endoscopic operation, such as a prick and a retractor, for example.

A display device 5155 displays an image of the operation site in the body cavity of the patient 5185, which is captured by the endoscope 5115. While watching the image of the operation site displayed on the display device 5155 in real time, the operator 5181 performs treatment such as incision of an affected part by using the energy treatment instrument 5135 and the forceps 5137, for example. Note that, although not illustrated, the pneumoperitoneum tube 5133, the energy treatment instrument 5135, and the forceps 5137 are supported by the operator 5181 or an assistant or the like in an operation.

(Support Arm Device)

The support arm device 5141 includes an arm unit 5145 extending from a base unit 5143. In the illustrated example, the arm unit 5145 includes joint parts 5147a, 5147b, and 5147c, and links 5149a and 5149b, and is driven under control of an arm control device 5159. The endoscope 5115 is supported by the arm unit 5145, and the position and posture thereof are controlled. Accordingly, stable position fixation of the endoscope 5115 can be achieved.

(Endoscope)

The endoscope 5115 includes a lens barrel 5117, a region of which extending from a leading end by a predetermined length is inserted into the body cavity of the patient 5185, and a camera head 5119 connected with a base end of the lens barrel 5117. In the illustrated example, the endoscope 5115 is what is called a rigid scope including the rigid lens barrel 5117, but the endoscope 5115 may be what is called a flexible scope including a flexible lens barrel 5117.

The leading end of the lens barrel 5117 is provided with an opening to which an objective lens is fitted. The endoscope 5115 is connected with a light source device 5157, and light generated by the light source device 5157 is guided to the leading end of the lens barrel by a light guide extending inside the lens barrel 5117, and emitted toward an observation target in the body cavity of the patient 5185 through the objective lens. Note that the endoscope 5115 may be a direct-view scope, an oblique view scope, or a side view scope.

An optical system and an image sensor are provided inside the camera head 5119, and reflected light (observation light) from the observation target is condensed onto the image sensor through the optical system. The image sensor photoelectrically converts the observation light, and generates an electric signal corresponding to the observation light, in other words, an image signal corresponding to an observation image. This image signal is transmitted to a camera control unit (CCU) 5153 as RAW data. Note that the camera head 5119 has a function of adjusting the magnification and focal length thereof by driving an optical system thereof as appropriate.

Note that, to cope with, for example, stereoscopic viewing (3D display) or the like, the camera head 5119 may include a plurality of image sensors. In this case, a plurality of relay optical systems are provided inside the lens barrel 5117 to guide observation light to each of the plurality of image sensors.

(Various Devices Mounted on Cart)

The CCU 5153 is achieved by, for example, a central processing unit (CPU) or a graphics processing unit (GPU), and controls overall operation of the endoscope 5115 and a display device 5155. Specifically, the CCU 5153 provides an image signal received from the camera head 5119 with various kinds of image processing such as image development processing (demosaic processing), for example, for displaying an image based on the image signal. The CCU 5153 provides the image signal provided with the image processing to the display device 5155. Furthermore, the CCU 5153 is connected with the audio-visual controller 5107 illustrated in FIG. 11. The CCU 5153 also provides the image signal provided with the image processing to the audio-visual controller 5107. Furthermore, the CCU 5153 transmits a control signal to the camera head 5119 to control drive thereof. The control signal may include information associated with image capturing conditions, such as the magnification and the focal length. The information associated with image capturing conditions may be input through an input device 5161, or may be input through the integrated operation panel 5111 described above.

The display device 5155 displays, under control of the CCU 5153, an image based on the image signal provided with the image processing by the CCU 5153. In a case where the endoscope 5115 copes with, for example, image capturing at high resolution such as 4K (horizontal pixel number 3840×vertical pixel number 2160) or 8K (horizontal pixel number 7680×vertical pixel number 4320), and/or in a case where the endoscope 5115 copes with 3D display, the display device 5155 may be a device capable of performing high resolution display and/or a device capable of performing 3D display, respectively. In a case where the display device 5155 is compatible with image capturing at high resolution such as 4K or 8K, a more immersive feeling can be obtained by using the display device 5155 having a size of 55 inches or larger. Furthermore, a plurality of display devices 5155 having resolutions and sizes different from each other may be provided in accordance with usage.

The light source device 5157 is achieved by a light source such as a light emitting diode (LED), for example, and supplies, to the endoscope 5115, irradiation light at image capturing of an operation site.

The arm control device 5159 is achieved by a processor such as a CPU, for example, and operates in accordance with a predetermined computer program when controlling drive of the arm unit 5145 of the support arm device 5141 in accordance with a predetermined control scheme.

An input device 5161 is an input interface for the endoscopic operation system 5113. A user can input various kinds of information and instructions to the endoscopic operation system 5113 through the input device 5161. For example, the user inputs, through the input device 5161, various kinds of information related to an operation, such as body information of the patient and information regarding an operative method. Furthermore, the user inputs, through the input device 5161, for example, an instruction for driving the arm unit 5145, an instruction for changing conditions (such as the kind of irradiation light, the magnification, and the focal length) of image capturing by the endoscope 5115, an instruction for driving the energy treatment instrument 5135, and the like.

The kind of the input device 5161 is not limited, but the input device 5161 may be well-known various input devices. The input device 5161 may be, for example, a mouse, a keyboard, a touch panel, a switch, a foot switch 5171, and/or a lever. In a case where the input device 5161 is a touch panel, the touch panel may be provided on the display surface of the display device 5155.

Alternatively, the input device 5161 may be a device worn by the user, such as a wearable glass device or a head mounted display (HMD), for example, and various kinds of input are performed in accordance with the gesture and sight line of the user detected by the device. Furthermore, the input device 5161 includes a camera capable of detecting motion of the user, and various kinds of input are performed in accordance with the gesture and sight line of the user detected from video captured by the camera. In addition, the input device 5161 includes a microphone capable of collecting voice of the user, and various kinds of input are performed by voice through the microphone. In this manner, various kinds of information can be input through the input device 5161 in a non-contact manner, and in particular, a user (for example, the operator 5181) belonging to the clean area can operate an instrument belonging to the unclean area in a non-contact manner. Furthermore, the user can operate a held operation instrument without removing a hand from the instrument, which leads to improved convenience for the user.

A treatment instrument control device 5163 controls drive of the energy treatment instrument 5135 for, for example, tissue cauterization, incision, or blood vessel sealing. To obtain the visual field of the endoscope 5115 and a work space for an operator, a pneumoperitoneum apparatus 5165 feeds gas into the body cavity of the patient 5185 through the pneumoperitoneum tube 5133 to expand the body cavity. A recorder 5167 is a device capable of recording various kinds of information related to operations. A printer 5169 is a device capable of printing various kinds of information related to operations in various formats of text, image, graph, and the like.

The following describes a particularly characteristic configuration of the endoscopic operation system 5113 in more detail.

(Support Arm Device)

The support arm device 5141 includes the base unit 5143 as a base, and the arm unit 5145 extending from the base unit 5143. In the illustrated example, the arm unit 5145 includes the plurality of joint parts 5147a, 5147b, and 5147c, and the plurality of links 5149a and 5149b coupled with each other through the joint part 5147b. However, in FIG. 13, the configuration of the arm unit 5145 is illustrated in a simplified manner for simplification. In reality, for example, the shapes, numbers, and disposition of the joint parts 5147a to 5147c and the links 5149a and 5149b, and the directions of the rotational axes of the joint parts 5147a to 5147c can be set as appropriate so that the arm unit 5145 has a desired degree of freedom. For example, the arm unit 5145 preferably has six or more degrees of freedom. Accordingly, the endoscope 5115 can be freely moved in the movable range of the arm unit 5145, and thus the lens barrel 5117 of the endoscope 5115 can be inserted into the body cavity of the patient 5185 in a desired direction.

The joint parts 5147a to 5147c are each provided with an actuator, and rotatable about a predetermined rotational axis through drive of the actuator. The arm control device 5159 controls drive of the actuator to control the rotation angle of each of the joint parts 5147a to 5147c, thereby controlling drive of the arm unit 5145. Accordingly, the position and posture of the endoscope 5115 can be controlled. In this case, the arm control device 5159 can control drive of the arm unit 5145 in various well-known control schemes of force control, position control, or the like.

For example, when the operator 5181 performs an operation input through the input device 5161 (including the foot switch 5171) as appropriate, the arm control device 5159 may control drive of the arm unit 5145 in accordance with the operation input as appropriate, thereby controlling the position and posture of the endoscope 5115. Through this control, the endoscope 5115 at the leading end of the arm unit 5145 can be moved from an optional position to another optional position, and then fixedly supported at the position after the movement. Note that the arm unit 5145 may be operated in what is called a master slave scheme. In this case, the arm unit 5145 can be remotely operated by the user through the input device 5161 installed at a place separated from the operation room.

Furthermore, in a case where force control is applied, the arm control device 5159 may perform what is called power assist control in which the actuators of the joint parts 5147a to 5147c are driven so that the arm unit 5145 receives external force from the user and smoothly moves along the external force. Accordingly, when moving the arm unit 5145 while directly touching the arm unit 5145, the user can move the arm unit 5145 with relatively weak force. Thus, the endoscope 5115 can be more intuitively moved through a simpler operation, which leads to improved convenience for the user.

In an endoscopic operation, the endoscope 5115 is typically supported by a doctor called scopist. However, the position of the endoscope 5115 can be more reliably fixed not manually but by using the support arm device 5141, and thus an image of an operation site can be reliably obtained, which leads to a smooth operation.

Note that the arm control device 5159 does not necessarily need to be provided to the cart 5151. Furthermore, the arm control device 5159 does not necessarily need to be a single device. For example, the arm control device 5159 may be provided to each of the joint parts 5147a to 5147c of the arm unit 5145 of the support arm device 5141 to achieve drive control of the arm unit 5145 through cooperation of the plurality of arm control devices 5159.

(Light Source Device)

The light source device 5157 supplies irradiation light to the endoscope 5115 when capturing an image of an operation site. The light source device 5157 is achieved by, for example, an LED, a laser beam source, or a white light source constituted by a combination thereof. In a case where the white light source is achieved by a combination of RGB laser beam sources, the output intensity and output timing of each color (each wavelength) can be highly accurately controlled, and thus the light source device 5157 can adjust the white balance of a captured image. Furthermore, in this case, an image corresponding to each of RGB can be captured in a time divisional manner by irradiating an observation target with laser beams from the respective RGB laser beam sources in a time divisional manner and controlling drive of the image sensor of the camera head 5119 in synchronization with the timing of the irradiation. According to this method, a color image can be obtained without a color filter provided to the image sensor.

Furthermore, drive of the light source device 5157 may be controlled to change the intensity of output light in each predetermined time. A high dynamic range image without what is called a black defect and overexposure can be generated by controlling drive of the image sensor of the camera head 5119 in synchronization with the timing of change of the light intensity to acquire images in a time divisional manner and synthesizing the images.

Furthermore, the light source device 5157 may be capable of supplying light in a predetermined wavelength band corresponding to special light observation. The special light observation involves, for example, what is called narrow band light observation (narrow band imaging) that performs image capturing of a predetermined tissue such as a blood vessel in a mucous membrane surface layer at high contrast by emitting light in a band narrower than that of irradiation light (in other words, white light) at normal observation by utilizing the wavelength dependency of light absorption at a body tissue. Alternatively, the special light observation may involve fluorescence observation that obtains an image through fluorescence caused by excitation light irradiation. In the fluorescence observation, for example, fluorescence from a body tissue can be observed by irradiating the body tissue with excitation light (autofluorescence observation), or a fluorescent image can be obtained by locally injecting a reagent such as indocyanine green (ICG) into a body tissue and irradiating the body tissue with excitation light corresponding to the fluorescence wavelength of the reagent. The light source device 5157 may be capable of supplying narrow band light and/or excitation light corresponding to such special light observation.

(Camera Head and CCU)

Figure 14:
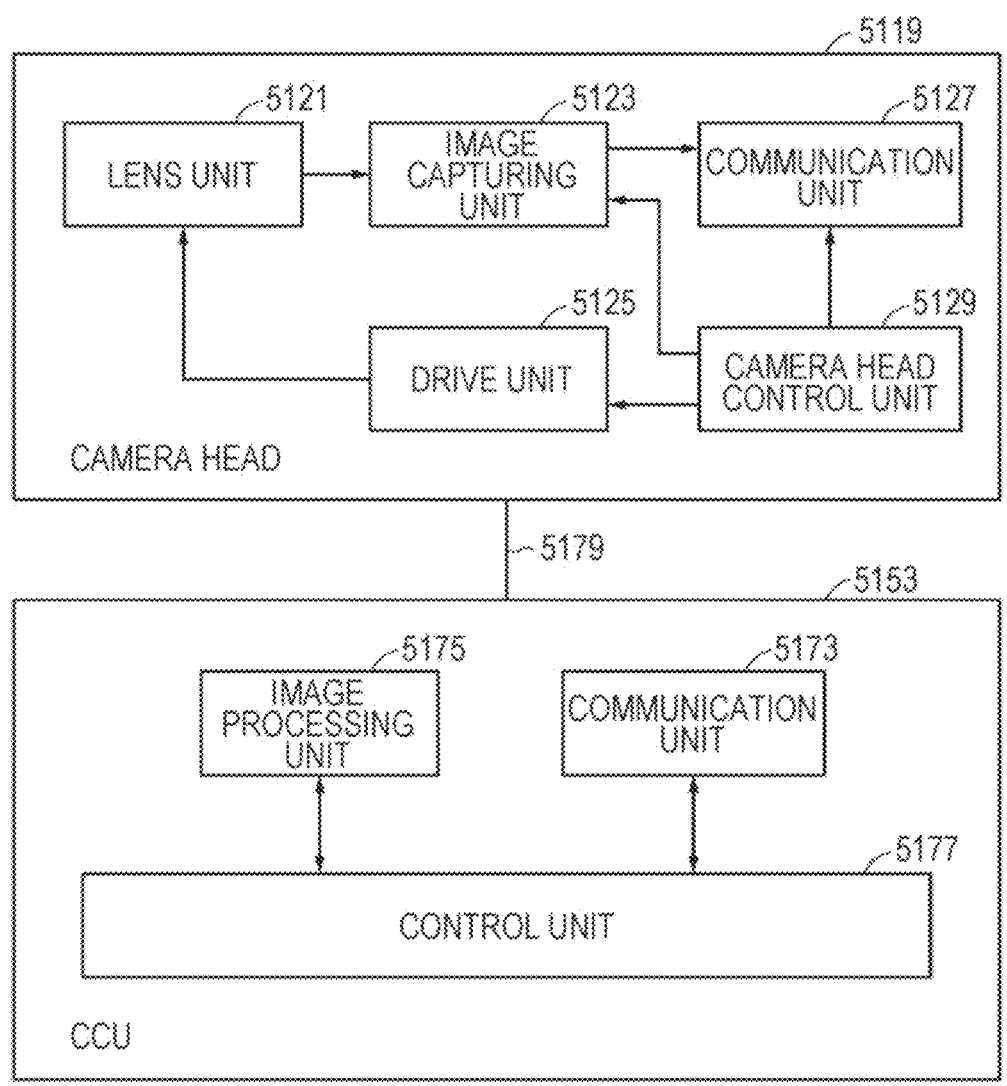
FIG. 14 is a block diagram illustrating exemplary functional configurations of a camera head and a CCU illustrated in FIG. 13.

The following describes functions of the camera head 5119 and the CCU 5153 of the endoscope 5115 in more detail with reference to FIG. 14. FIG. 14 is a block diagram illustrating exemplary functional configurations of the camera head 5119 and the CCU 5153 illustrated in FIG. 13.

As illustrated in FIG. 14, the camera head 5119 includes, as functions thereof, a lens unit 5121, an image capturing unit 5123, a drive unit 5125, a communication unit 5127, and a camera head control unit 5129. Furthermore, the CCU 5153 includes, as functions thereof, a communication unit 5173, an image processing unit 5175, and a control unit 5177. The camera head 5119 and the CCU 5153 are connected with each other through a transmission cable 5179 to perform bidirectional communication therebetween.

The following first describes a functional configuration of the camera head 5119. The lens unit 5121 is an optical system provided at a connection part with the lens barrel 5117. Observation light acquired from the leading end of the lens barrel 5117 is guided to the camera head 5119 and incident on the lens unit 5121. The lens unit 5121 is achieved by a combination of a plurality of lenses including a zoom lens and a focus lens. The optical characteristics of the lens unit 5121 are adjusted so that observation light condenses on the light-receiving surface of an image sensor of the image capturing unit 5123. Furthermore, the zoom lens and the focus lens are movable on the optical axis for adjustment of the magnification and focal point of a captured image.

The image capturing unit 5123 includes an image sensor and is disposed after the lens unit 5121. Observation light having passed through the lens unit 5121 is condensed on the light-receiving surface of the image sensor, and an image signal corresponding to an observation image is generated through photoelectric conversion. The image signal generated by the image capturing unit 5123 is provided to the communication unit 5127.

The image sensor included in the image capturing unit 5123 is, for example, an image sensor of a complementary metal oxide semiconductor (CMOS) type, which includes a Bayer array and is capable of capturing a color image. Note that the image sensor may be capable of, for example, capturing of an image at high resolution equal to 4K or higher. When an image of an operation site can be obtained at high resolution, the operator 5181 can understand the situation of the operation site in more detail and more smoothly proceed an operation.

Furthermore, the image sensor included in the image capturing unit 5123 includes a pair of image sensors for acquiring image signals for right and left eyes, respectively, corresponding to 3D display. When 3D display is performed, the operator 5181 can more accurately recognize the depth of a living body tissue at an operation site. Note that, in a case where the image capturing unit 5123 is of the multi-plate type, a plurality of systems of lens units 5121 are provided for the respective image sensors.

Furthermore, the image capturing unit 5123 does not necessarily need to be provided to the camera head 5119. For example, the image capturing unit 5123 may be provided right after the objective lens inside the lens barrel 5117.

The drive unit 5125 is achieved by an actuator and moves, under control of the camera head control unit 5129, each of the zoom lens and the focus lens of the lens unit 5121 by a predetermined distance in the optical axis. Accordingly, the magnification and focal position of an image captured by the image capturing unit 5123 can be adjusted as appropriate.

The communication unit 5127 is achieved by a communication device for communicating various kinds of information with the CCU 5153. The communication unit 5127 transmits an image signal acquired from the image capturing unit 5123 to the CCU 5153 through the transmission cable 5179 as RAW data. In this case, the image signal is preferably transmitted through optical communication to display a captured image of an operation site at low latency. In an operation, the operator 5181 performs the operation while observing the state of an affected part on the captured image, and thus a moving image of the operation site is required to be displayed in real time as much as possible for a safer and more reliable operation. In a case where optical communication is performed, the communication unit 5127 is provided with a photoelectric conversion module configured to convert an electric signal into an optical signal. An image signal is converted into an optical signal by the photoelectric conversion module, and then transmitted to the CCU 5153 through the transmission cable 5179.

Furthermore, the communication unit 5127 receives a control signal for controlling drive of the camera head 5119 from the CCU 5153. The control signal includes information associated with image capturing conditions such as information for specifying the frame rate of the captured image, information for specifying the exposure value at image capturing, and/or information specifying the magnification and focal position of the captured image, for example. The communication unit 5127 provides the received control signal to the camera head control unit 5129. Note that the control signal from the CCU 5153 may be transmitted through optical communication. In this case, the communication unit 5127 is provided with a photoelectric conversion module configured to convert an optical signal into an electric signal, and the control signal is converted into an electric signal by the photoelectric conversion module, and then provided to the camera head control unit 5129.

Note that the above-described image capturing conditions such as the frame rate, the exposure value, the magnification, and the focal point are automatically set on the basis of an acquired image signal by the control unit 5177 of the CCU 5153. Thus, the endoscope 5115 has what is called an auto exposure (AE) function, an auto focus (AF) function, and an auto white balance (AWB) function.

The camera head control unit 5129 controls drive of the camera head 5119 on the basis of a control signal received from the CCU 5153 through the communication unit 5127. For example, the camera head control unit 5129 controls drive of the image sensor of the image capturing unit 5123 on the basis of information for specifying the frame rate of a captured image and/or information for specifying exposure at image capturing. Furthermore, for example, the camera head control unit 5129 moves the zoom lens and focus lens of the lens unit 5121 as appropriate through the drive unit 5125 on the basis of information for specifying the magnification and focal point of a captured image. The camera head control unit 5129 may further have a function of storing information for identifying the lens barrel 5117 and the camera head 5119.

Note that, when the lens unit 5121, the image capturing unit 5123, and the like are disposed in a sealed structure having high airtightness and waterproofness, the camera head 5119 can have resistance to autoclave sterilization processing.

The following describes a functional configuration of the CCU 5153. The communication unit 5173 is achieved by a communication device for communicating various kinds of information with the camera head 5119. The communication unit 5173 receives an image signal transmitted from the camera head 5119 through the transmission cable 5179. The image signal is preferably transmitted through optical communication as described above. In this case, to achieve the optical communication, the communication unit 5173 is provided with a photoelectric conversion module configured to convert an optical signal into an electric signal. The communication unit 5173 provides an image signal converted into an electric signal to the image processing unit 5175.

Furthermore, the communication unit 5173 transmits, to the camera head 5119, a control signal for controlling drive of the camera head 5119. The control signal may be transmitted through optical communication.

The image processing unit 5175 provides various kinds of image processing to an image signal as RAW data transmitted from the camera head 5119. This image processing includes various kinds of publicly known signal processing such as development processing (demosaic processing), high image quality processing (for example, band emphasis processing, super-resolution processing, noise reduction (NR) processing, and/or image blur correction processing), and/or enlargement processing (electronic zoom processing), for example. Furthermore, the image processing unit 5175 performs detection processing on an image signal for performing AE, AF, and AWB.

The image processing unit 5175 is achieved by a processor such as a CPU or a GPU, and the above-described image processing and detection processing can be performed by the processor operating in accordance with a predetermined computer program. Note that, in a case where the image processing unit 5175 is achieved by a plurality of GPUs, the image processing unit 5175 divides information related to an image signal as appropriate, and performs the image processing in parallel through the plurality of GPUs.

The control unit 5177 performs various control related to image capturing of an operation site by the endoscope 5115 and display of the captured image. For example, the control unit 5177 generates a control signal for controlling drive of the camera head 5119. In a case where an image capturing condition is input by the user, the control unit 5177 generates a control signal on the basis of the input by the user. Alternatively, in a case where the endoscope 5115 has the AE function, the AF function, and the AWB function, the control unit 5177 generates a control signal by calculating optimum exposure value, focal length, and white balance as appropriate in accordance with a result of the detection processing by the image processing unit 5175.

Furthermore, the control unit 5177 displays, on the display device 5155, an image of an operation site on the basis of an image signal subjected to image processing by the image processing unit 5175. In this case, the control unit 5177 recognizes various objects in the operation site image by using various image recognition technologies. For example, the control unit 5177 can recognize, for example, an operation instrument such as forceps, a particular living body site, bleeding, or mist at use of the energy treatment instrument 5135 by detecting, for example, the shape or color of an edge of an object included in the operation site image. In displaying the captured image on the display device 5155, the control unit 5177 uses a result of the recognition to display various kinds of operation support information on an image of the operation site in a superimposing manner. When the operation support information is displayed in a superimposing manner and presented to the operator 5181, an operation can proceed in a safer and more reliable manner.

The transmission cable 5179 connecting the camera head 5119 and the CCU 5153 is an electric signal cable compatible with electric signal communication, an optical fiber compatible with optical communication, or a composite cable thereof.

Here, in the illustrated example, wired communication is performed through the transmission cable 5179, but communication between the camera head 5119 and the CCU 5153 may be performed in a wireless manner. In a case where the communication therebetween is performed in a wireless manner, it is unnecessary to lay the transmission cable 5179 in the operation room, thereby preventing a situation in which the transmission cable 5179 interferes with movement of a medical staff in the operation room.

The above describes an exemplary operation room system 5100 to which the technology according to the present disclosure is applicable. Note that the above description is made with an example in which a medical system to which the operation room system 5100 to applied is the endoscopic operation system 5113, but the configuration of the operation room system 5100 is not limited to the example. For example, the operation room system 5100 may be applied to an examination flexible endoscope system or a microscope operation system in place of the endoscopic operation system 5113.

The technology according to the present disclosure can output captured operation site image and video to an external display device with less delay, thereby improving the accuracy of diagnosis in remote medical care.

3. Modifications

Although the embodiment of the present technology is specifically described above, the present technology is not limited to the above-described embodiment, but various modifications are possible based on the technical idea of the present technology.

In the embodiment, the length of each segment is one second, but is not limited thereto. The segment length may be longer or shorter than one second. However, according to the present technology, in a case where a segment is not at the distribution device 20, frame dropping occurs at the segment in content distribution. Accordingly, when the segment is long, frame dropping occurs for a longer time, which provides discomfort to the viewer. Thus, the segment length is preferably set with taken into account the network communication speed and the allowable time of frame dropping.

In the embodiment, each sub segment is provided with a denominator indicating the number of segment divisions, and a number indicating the order of the sub segment. However, the present technology is not limited to the notation method with a denominator and a numerator as long as the number of segment divisions is indicated. Any notation method indicating the number of segment divisions and the number indicating the order of the sub segment is applicable. For example, the number of segment divisions and the number indicating the order of the sub segment are provided side by side.

In the transmission device 10, the encoder 11 may receive network communication speed information from the uploaders 16a, 16b, and 16c, and may perform encoding at a reduced bit rate in a case where the communication speed is low. The encoding at a reduced bit rate leads to a reduced data size with degraded image quality of a content, and thus uploading is possible through a network having a low communication speed.

In the embodiment, a plurality of networks are provided by communication carriers different from each other, but the present technology is not limited to a case where all networks provided by the communication carriers different from each other. Although the communication carriers of the networks are preferably all different from each other, a case where some networks are provided by one communication carrier is not excluded unless all networks are provided by one communication carrier.

Furthermore, the number of video cameras 1 is not limited to one but may be larger than one. Furthermore, image capturing can be performed by a plurality of video cameras 1, and recorded contents of all video cameras 1 can be uploaded to the distribution device 20 and transmitted in segments from the distribution device 20 to the operator of the video cameras 1. Accordingly, while checking video of all video cameras 1, the operator can control the image capturing range, the image capturing direction, and the like of each of the plurality of video cameras 1. Furthermore, the external device connected with the transmission device 10 may be a microphone only, or may be any device configured to generate contents. Furthermore, an already completed content such as a movie produced in advance or a recorded live moving image may be supplied to the transmission device 10.

An external device, such as a video camera, configured to, for example, record contents may have the function of the transmission device, and uploading to the distribution device 20 may be directly performed from the external device.

The present technology may be configured as described below.

(1)

A transmission device configured to encode content data, divide the encoded content data into a plurality of pieces of transmission data, and transmit the pieces to, through a plurality of uploaders and a plurality of networks corresponding to the plurality of uploaders, a distribution device configured to perform content distribution.

(2)

The transmission device according to (1), in which the transmission data is segments generated by dividing the content data.

(3)

The transmission device according to (1), in which the transmission data is sub segments generated by each dividing segment generated by dividing the content data.

(4)

The transmission device according to (3), in which each sub segment is provided with a number indicating the segment including the sub segment.

(5)

The transmission device according to (3) or (4), in which each sub segment is provided with the number of divisions of the segment and a number indicating the order of the sub segment.

(6)

The transmission device according to any one of (1) to (5), in which the transmission data is transmitted by preferentially using a network having the highest communication speed among the plurality of networks on the basis of the communication speeds of the plurality of networks.

(7)

The transmission device according to any one of (1) to (6), in which the number of divisions of the content data is changed with a network having the lowest communication speed among the plurality of networks as a reference.

(8)

The transmission device according to any one of (1) to (7), in which the bit rate of the content data is changed on the basis of the communication speeds of the plurality of networks.

(9)

The transmission device according to (2), in which distribution of the content from the distribution device to the terminal device is performed in units of segments, and any of the segments that does not reach the distribution device in a predetermined time is excluded from live distribution from the distribution device to the terminal device.

(10)

The transmission device according to (3), in which distribution of the content from the distribution device to the terminal device is performed in units of segments, and the segment including any of the sub segments that does not reach the distribution device in a predetermined time is excluded from live distribution from the distribution device to the terminal device.

(11)

A transmission method of encoding content data, dividing the encoded content data into a plurality of pieces of transmission data, and transmitting the pieces to, through a plurality of uploaders and a plurality of networks corresponding to the plurality of uploaders, a distribution device configured to perform content distribution.

(12)

A content distribution system including:

a transmission device configured to encode content data, divide the encoded content data into a plurality of pieces of transmission data, and transmit the pieces to a distribution device through a plurality of uploaders and a plurality of networks corresponding to the plurality of uploaders; and a distribution device configured to receive the transmission data transmitted from the transmission device and transmit the transmission data to a terminal device to perform content distribution.

REFERENCE SIGNS LIST

10 Transmission device
16*a*, 16*b*, 16*c* Uploader
20 Distribution device
100 Content distribution system
NW1, NW2, NW3 Network

The invention claimed is:

1. A transmission device, comprising:
 circuitry configured to:
  encode content data;
  divide the encoded content data into a plurality of pieces of transmission data based on a communication speed of a first network of a plurality of networks, wherein the communication speed of the first network is lowest among communication speeds of the plurality of networks; and
  transmit the plurality of pieces of transmission data, based on a plurality of uploaders and the plurality of networks, to a distribution device, wherein
   the plurality of networks corresponds to the plurality of uploaders,
   the distribution device performs content distribution, and
   the content distribution is associated with the plurality of pieces of transmission data.

2. The transmission device according to claim 1, wherein the plurality of pieces of transmission data is a plurality of segments.

3. The transmission device according to claim 1, wherein the circuitry is further configured to:
 divide the encoded content data into a plurality of segments; and
 divide each of the plurality of segments into a plurality of sub segments, wherein the plurality of pieces of transmission data corresponds to the plurality of sub segments of each of the plurality of segments.

4. The transmission device according to claim 3, wherein each of the plurality sub segments of a specific segment of the plurality of segments is associated with a value, and the value indicates a number of sub segment in the specific segment.

5. The transmission device according to claim 3, wherein each of the plurality of sub segments of a specific segment of the plurality of segments is associated with a number of divisions of the specific segment and a number that indicates an order of respective sub segment from the plurality of sub segments of the specific segment.

6. The transmission device according to claim 1, wherein
the plurality of pieces of transmission data is transmitted based on a communication speed of a second network of the plurality of networks, and
the communication speed of the second network is highest among the communication speeds of the plurality of networks.

7. The transmission device according to claim 1, wherein a bit rate of the encoded content data is associated with communication speeds of the plurality of networks.

8. The transmission device according to claim 2, wherein
the distribution device performs the content distribution to a terminal device based on the plurality of segments,
the content distribution excludes a set of segments of the plurality of segments, and
each of the set of segments corresponds to a segment that does not reach the distribution device in a specific time.

9. The transmission device according to claim 3, wherein
the distribution device performs the content distribution to a terminal device based on the plurality of segments,
the content distribution excludes a specific segment of the plurality of segments, and
a sub segment of the plurality of sub segments of the specific segment does not reach the distribution device in a specific time.

10. A transmission method, comprising:
encoding content data;
dividing the encoded content data into a plurality of pieces of transmission data based on a communication speed of a first network of a plurality of networks, wherein the communication speed of the first network is lowest among communication speeds of the plurality of networks; and
transmitting the plurality of pieces of transmission data, based on a plurality of uploaders and the plurality of networks, to a distribution device, wherein
the plurality of networks corresponds to the plurality of uploaders,
the distribution device performs content distribution, and
the content distribution is associated with the plurality of pieces of transmission data.

11. A content distribution system, comprising:
a distribution device; and
a transmission device that comprises:
circuitry configured to:
encode content data;
divide the encoded content data into a plurality of pieces of transmission data based on a communication speed of a network of a plurality of networks, wherein the communication speed of the network is lowest among communication speeds of the plurality of networks; and
transmit the plurality of pieces of transmission data to the distribution device based on a plurality of uploaders and the plurality of networks, wherein the plurality of networks corresponds to the plurality of uploaders, wherein
the distribution device is configured to:
receive the plurality of pieces of transmission data from the transmission device; and
transmit the plurality of pieces of transmission data to a terminal device to perform content distribution, wherein the content distribution is associated with the plurality of pieces of transmission data.

* * * * *